United States Patent
Wang et al.

(10) Patent No.: US 12,238,041 B2
(45) Date of Patent: **\*Feb. 25, 2025**

(54) METHODS AND APPARATUSES FOR TRANSMITTING SIGNAL

(71) Applicant: Samsung Electronics Co., Ltd., Suwon-si (KR)

(72) Inventors: Yi Wang, Beijing (CN); Yingyang Li, Beijing (CN); Shichang Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,229

(22) Filed: Nov. 22, 2023

(65) Prior Publication Data

US 2024/0106611 A1    Mar. 28, 2024

Related U.S. Application Data

(63) Continuation of application No. 17/053,742, filed as application No. PCT/KR2019/005354 on May 3, 2019, now Pat. No. 11,831,578.

(30) Foreign Application Priority Data

May 10, 2018  (CN) .......................... 201810445914.7
Jun. 15, 2018  (CN) .......................... 201810619318.6
(Continued)

(51) Int. Cl.
H04L 5/00    (2006.01)
H04W 72/20   (2023.01)
H04W 74/0808 (2024.01)

(52) U.S. Cl.
CPC .......... H04L 5/0091 (2013.01); H04L 5/0044 (2013.01); H04L 5/0053 (2013.01);
(Continued)

(58) Field of Classification Search
CPC ... H04L 5/0044; H04L 5/0053; H04L 5/0091; H04W 72/20
See application file for complete search history.

(56) References Cited

U.S. PATENT DOCUMENTS 11,388,745 B2    7/2022  Takeda et al.
2011/0269490 A1  11/2011 Earnshaw et al.
(Continued)

FOREIGN PATENT DOCUMENTS

WO    2017099860 A1    6/2017
WO    2017135745 A1    8/2017

OTHER PUBLICATIONS

Decision of Patent issued Feb. 20, 2024, in connection with Korean Patent Application No. 10-2020-7032485, 9 pages.
(Continued)

*Primary Examiner* — Kevin C. Harper

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments of the present invention provide a method for transmitting a signal, comprising: selecting a starting position of the signal from a set of candidate starting positions for transmitting the signal; determining a symbol (Continued)

mapping of the signal based on a selected starting position or a set of candidate starting positions of the signal; and transmitting the signal is based on the symbol mapping. The embodiment of the invention also provides a corresponding apparatus.

12 Claims, 16 Drawing Sheets

(30) Foreign Application Priority Data

Sep. 26, 2018 (CN) .......................... 201811127798.0
Mar. 26, 2019 (CN) .......................... 201910236504.6

(52) U.S. Cl.
CPC ............. *H04W 72/20* (2023.01); *H04L 5/001* (2013.01); *H04L 5/0048* (2013.01); *H04W 74/0808* (2013.01)

(56) References Cited

U.S. PATENT DOCUMENTS

| | | | |
|---|---|---|---|
| 2013/0201841 | A1 | 8/2013 | Zhang et al. |
| 2014/0286255 | A1 | 9/2014 | Nam et al. |
| 2017/0111160 | A1 | 4/2017 | Chen et al. |
| 2018/0227908 | A1 | 8/2018 | Wang et al. |
| 2018/0302895 | A1 | 10/2018 | Akkarakaran et al. |
| 2019/0029046 | A1 | 1/2019 | Li et al. |
| 2019/0069322 | A1 | 2/2019 | Davydov et al. |
| 2019/0090261 | A1 | 3/2019 | Yang |
| 2019/0297635 | A1 | 9/2019 | Wu et al. |
| 2020/0099478 | A1 | 3/2020 | Li et al. |
| 2020/0351867 | A1* | 11/2020 | Guo ..................... H04L 5/0051 |

OTHER PUBLICATIONS

NTT Docomo, Inc., "Offline discussion for UL data transmission procedure," 3GPP TSG RAN WG1 NR Ad Hoc Meeting R1-1801128, Vancouver, Canada, Jan. 2018, 11 pages.

Ericsson, "On Remaining Issues on UCI Multiplexing on PUSCH," 3GPP TSG RAN WG1 Meeting #92 R1-1802908, Athens, Greece, Feb. 26-Mar. 2, 2018, 18 pages.

Supplementary European Search Report dated Dec. 1, 2021, in connection with European Application No. 19799896.6, 11 pages.

LG Electronics, "Remaining issues on UCI multiplexing," R1-1802212, 3GPP TSG RAN WG1 Meeting #92, Athens, Greece, Feb. 26-Mar. 2, 2018, 8 pages.

LG Electronics, "HARQ operation and control signaling for autonomous UL access," R1-1802154, 3GPP TSG RAN WG1 Meeting 92, Athens, Greece, Feb. 26-Mar. 2, 2018, 7 pages.

Qualcomm Incorporated, "Aspects related to UL control channels," R1-1802310, 3GPP TSG RAN WG1 #92, Athens, Greece, Feb. 26-Mar. 2, 2018, 9 pages.

Office Action dated Apr. 28, 2023, from the China National Intellectual Property Administration (CNIPA) in connection with counterpart Chinese Application No. 202111447890.7, 8 pages.

Office Action dated Jul. 7, 2023, from the Korean Intellectual Property Office (KIPO) in connection with counterpart Korean Application No. 10-2020-7032485, 9 pages.

Sequans Communications, "On multiple starting and ending positions in LAA UL subframe", 3GPP TSG RAN WG1 Meeting #90, Aug. 21-25, 2017, R1-1714003, 4 pages.

Huawei, HiSilicon, "Support for multiple starting and ending positions in a subframe for UL on SCell with frame structure 3", 3GPP TSG RAN WG1 Meeting #89, May 15-19, 2017, R1-1707029, 7 pages.

Oppo, "Views on physical layer channel design for NR-U", 3GPP TSG RAN WG1 Meeting #92bis, Apr. 16-20, 2018, R1-1803974, 3 pages.

Nokia et al., "Multiple starting and ending positions in a subframe for UL", 3GPP TSG RAN WG1 Meeting #92, Feb. 26-Mar. 2, 2018, R1-1802264, 5 pages.

Huawei, HiSilicon, "UCI transmission in NR operations in unlicensed", 3GPP TSG RAN WG1 Meeting #92bis, Apr. 16-20, 2018, R1-1803682, 6 pages.

International Search Report dated Aug. 14, 2019 in connection with International Patent Application No. PCT/KR2019/005354, 5 pages.

Written Opinion of the International Searching Authority dated Aug. 14, 2019 in connection with International Patent Application No. PCT/KR2019/005354, 7 pages.

Office Action dated Sep. 21, 2022 in connection with Indian Patent Application No. 202017048377, 6 pages.

Communication pursuant to Article 94(3) EPC dated Nov. 21, 2023, in connection with European Patent Application No. 19799896.6, 7 pages.

* cited by examiner

METHODS AND APPARATUSES FOR TRANSMITTING SIGNAL

CROSS-REFERENCE TO RELATED APPLICATIONS

This application is a continuation of application Ser. No. 17/053,742 filed on Nov. 6, 2020, which is a 371 of International Application No. PCT/KR2019/005354 filed on May 3, 2019, which claims priority to Chinese Patent Application No. 201810445914.7 filed on May 10, 2018, Chinese Patent Application No. 201810619318.6 filed on Jun. 15, 2018, Chinese Patent Application No. 201811127798.0 filed on Sep. 26, 2018, and Chinese Patent Application No. 201910236504.6 filed on Mar. 26, 2019, the disclosures of which are herein incorporated by reference in their entirety.

BACKGROUND

1. Field

The present invention relates to the field of mobile communication technologies, and in particular, to a method and apparatus for transmitting signals.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In order to meet the huge traffic demand, the 5G communication system is expected to work from the low frequency band up to the high frequency band about 100G, including licensed bands and unlicensed bands. Among them, 5 GHz band and 60 GHz band in the unlicensed band are mainly considered. The 5G system working on the unlicensed band is referred to as the NR-U system, which may work independently on the unlicensed bands, may work on the licensed bands by means of a Dual Connectivity (DC), and also may work on the licensed band by means of Carrier Aggregation (CA). In the 5 GHz band, the 802.11 series of Wireless Fidelity (WiFi) systems, radars, and LTE's license assisted access (LAA) systems have been deployed, all following the Listen Before Talk (LBT) mechanism. That is, the wireless channel must be detected before transmitting the signal, and the wireless channel can be occupied for transmitting the signal only when the wireless channel is detected to be idle. In the 60 GHz band, 802.11ay systems already exist, which shall also follow the LBT mechanism. In other unlicensed bands, an effective coexistence method shall be established according to the corresponding specifications.

In the existing systems, there are two ways to support the UE to perform uplink transmission. One is based on real-time scheduling of base stations, which is referred to as Scheduled based UL Grant (SUL). Before transmitting the signal, the UE needs to receive a UL grant sent by the base station, and the UL grant includes information such as a time-frequency resource on which the UE transmits the PUSCH. The UE transmits the PUSCH on the resources indicated by the UL grant. On the unlicensed band, the base station needs to perform LBT before transmitting the UL grant, and the UE needs to perform LBT before the uplink subframe indicated by the UL grant. The PUSCH scheduled by the UL grant can only be transmitted if both LBTs succeed. Another way is that we call it a GUL (UL transmission with configured grant). The base station semi-statically configures time-frequency resources. When the UE has data to transmit, it does not need base station's scheduling. The UE can try to transmit on these resources. If there is no data, there is no transmission. On the unlicensed band, the UE needs to perform LBT before uplink transmission, and it can transmit PUSCH on the configured resources if the LBT succeeds. In the PUSCH scheduled according to the GUL, the UE may transmit both uplink data and uplink control information (UCI), for example, a symbol for indicating start and end of the PUSCH, HARQ information (such as NDI, RV, HARQ_ID, etc.), and UE's identity information (UE ID), etc. In a 5G system, transmission on an unlicensed band can take both types of uplink transmissions into account.

In some cases, for example, when the base station expects to receive PUSCHs of multiple UEs at the same time, the base station may allocate different frequency domain resources to the UEs. However, at least the starting points of the time domain resources are the same. The UEs that have completed the LBT can start transmitting at the same time to avoid the influence of the UE having an earlier stating point of the time domain resource on the UE having a later starting point of the time domain resource. In other scenarios, for example, when the base station expects to receive only one UE's PUSCH at a time, the base station may allocate a set of possible starting pints of time domain resources for multiple UEs, and these UEs may randomly select a starting point from the set of starting points. The UE that has completed the LBT and has an earlier stating point of the time domain resource can transmit, and the other UEs may abandon the transmission due to fail of the LBT. Alternatively, in some cases, the base station allows the UE to have more than one possible starting point in one subframe in order to increase the chance that the UE can successfully transmit. If the LBT succeeds before a certain starting point, the UE may start transmitting the PUSCH at this starting point. When the possible starting point is more than one, if the position of the reference signal or UCI is after the starting point of the actual transmission, the receiving party may not be able to perform channel estimation, not able to receive UCI, or even not able to receive PUSCH according to UCI, thereby performance is degraded.

Therefore, there is a need for a solution that can determine the starting point for transmitting signals (e.g., reference signals and UCI) to at least partially solve the above problems.

SUMMARY

According to a first aspect of the disclosure, a method for transmitting a signal is provided, comprising: determining a symbol mapping of the signal based on a selected starting position or a set of candidate starting positions of the signal; and transmitting the signal is based on the symbol mapping.

In some embodiments, the method further comprises selecting the starting position of the signal, for example, from the set of candidate starting positions.

In some embodiments, the signal comprises a Physical Uplink Shared Control Channel (PUSCH) or a Physical Downlink Shared Control Channel (PDSCH) which carries a Demodulation Reference Signal (DMRS), and wherein determining a symbol mapping of the signal based on a selected starting position or a set of candidate starting positions of the signal comprises: determining that a starting position of the DMRS is located at a starting boundary of an OFDM symbol if a candidate starting position that is the last in the set of candidate starting positions is located at the starting boundary of the OFDM symbol; and determining that a starting position of the DMRS is located at a starting boundary of a first OFDM symbol after the OFDM symbol if a candidate starting position that is the last in the set of candidate starting positions is not located at the starting boundary of the OFDM symbol.

In some embodiments, the DMRS comprises a plurality of groups of DMRSs, and a starting position of the DMRS is a starting position of a first group of DMRSs that are the earliest in the plurality of groups of DMRSs, and wherein the method further comprises: determining positions of other groups of DMRSs in the plurality of groups of DMRSs with reference to the starting position of the first set of DMRSs based on an offset between positions of the plurality of groups of DMRSs.

In some embodiments, the signal comprises a Physical Uplink Shared Control Channel (PUSCH) or a Physical Downlink Shared Control Channel (PDSCH) which carries a Demodulation Reference Signal (DMRS), and wherein determining a symbol mapping of the signal based on a selected starting position or a set of candidate starting positions of the signal comprises: positioning the DMRS within a first complete OFDM symbol after the selected starting position of the PUSCH, and wherein the starting position of the DMRS is located after an OFDM symbol in which a Listen Before Talk (LTB) detection succeeds.

In some embodiments, the signal comprises a Physical Uplink Shared Control Channel (PUSCH) or a Physical Downlink Shared Control Channel (PDSCH) which carries control information (such as Uplink Control Information (UCI) or Downlink Control Information (DCI)), and wherein determining a symbol mapping of the signal based on a selected starting position or a set of candidate starting positions of the signal comprises: determining that a starting position of the control information is not earlier than a starting boundary of an OFDM symbol if a candidate starting position that is the last in the set of candidate starting positions is located at the starting boundary of the OFDM symbol; and determining that the starting position of the control information is not earlier than a starting boundary of a first OFDM symbol after the OFDM symbol if the candidate starting position that is the last in the set of candidate starting positions is not located at the starting boundary of the OFDM symbol.

In some embodiments, if the OFDM symbol including the starting position of the control information is occupied by a Demodulation Reference Signal (DMRS), the starting position of the control information is determined to be at a starting boundary of a first OFDM symbol that does not include the DMRS after the OFDM symbol that is occupied by the DMRS.

In some embodiments, if a subcarrier where the OFDM symbol including the starting position of the control information is located is occupied by a Demodulation Reference Signal (DMRS), the starting position of the control information is determined to avoid the subcarrier occupied by the DMRS.

In some embodiments, if the DMRS comprises a plurality of groups of DMRSs, the starting position of the control information is determined to be at a starting position of a first OFDM symbol that does not include the DMRS after an OFDM symbol that is occupied by a first group of DMRSs in the plurality of groups of DMRSs.

In some embodiments, determining a symbol mapping of the signal based on a selected starting position or a set of candidate starting positions of the signal comprises: determining a starting position of the DMRS and/or control information carried in the signal based on a subcarrier spacing and/or a cyclic prefix used to transmit the signal.

In some embodiments, the signal comprises a Physical Uplink Shared Control Channel (PUSCH) or a Physical Downlink Shared Control Channel (PDSCH), and the method comprises: mapping the PUSCH to a scheduled slot; and dropping a portion of the PUSCH that is not mapped to the scheduled slot if the length of the PUSCH exceeds the number of symbols remaining in the scheduled slot.

According to a second aspect of the present invention, a method for transmitting a signal is provided, comprising: performing a Listen Before Talk (LBT) detection on each of a plurality of subbands for transmitting the signal, respectively; and mapping bits on a Physical Uplink Shared Control Channel (PUSCH) and a Physical Downlink Shared Control Channel (PDSCH) corresponding to subbands on which the LBT detection is successfully performed to the subbands on which the LBT detection is successfully performed.

In some embodiments, bits of one coding block are mapped in one subband, or bits of one coding block group are mapped in one subband.

In some embodiments, the method further comprises: indicating to a receiving party the subband for transmitting the signal.

According to a third aspect of the present invention, a method for transmitting a signal is provided, comprising: determining a redundancy version of respective PUSCHs of the same transmitted transport block according to configured or predefined redundancy version information, wherein the redundancy version of the last PUSCH of the same transport block is a self-decodable redundancy version.

In some embodiments, the self-decodable redundancy version number is zero.

According to a fourth aspect of the present invention, a apparatus for transmitting a signal is provided, comprising: a symbol mapping determining module configured to determine a symbol mapping of the signal based on a selected starting position or a set of candidate starting positions of the signal; and a transmitting module configured to transmit the signal based on the symbol mapping.

The apparatus may further comprise a position selecting module configured to selecting the starting position of the signal, for example, from set of candidate starting positions.

According to a fifth aspect of the present invention, a apparatus for transmitting a signal is provided, comprising: an LBT detecting module configured to perform a Listen Before Talk (LBT) detection on each of a plurality of subbands for transmitting the signal, respectively; and a bit mapping module is configured to map bits on a Physical Uplink Shared Control Channel (PUSCH) and a Physical Downlink Shared Control Channel (PDSCH) corresponding to subbands on which the LBT detection is successfully performed to the subbands on which the LBT detection is successfully performed.

According to a sixth aspect of the present invention, an apparatus for transmitting a signal is provided, comprising: a processor; and a memory configured to store machine readable instructions that, when executed by the processor, cause the processor to perform any of the methods described above.

According to a seventh aspect of the present invention, a computer readable storage medium having stored thereon executable instructions that, when executed by a processor, cause the processor to perform any of the methods described above.

According to a technical solution of an embodiment of the present invention, a symbol mapping of a signal (e.g., a reference signal and a UCI) carried in a signal (e.g., PUSCH) is determined based on a selected starting position or a set of candidate starting positions of the signal. Thereby, signals such as reference signals and UCI can be appropriately received at the receiving party to achieve good reception performance.

To solve at least some of the above problems, embodiments of the present disclosure propose a method and an apparatus for inter-frame encoding and decoding as described below.

BRIEF DESCRIPTION OF THE DRAWINGS

The foregoing and other features of the present disclosure will become more apparent from the following detailed description of the present disclosure taken in conjunction with the accompanying drawings in which.

Throughout the drawings, the same or similar structures are denoted by the same or similar reference numerals.

DETAILED DESCRIPTION

To make the purposes, technical solutions and advantages of the application more apparent, it will now be described in detail with reference to the accompanying drawings. It should be appreciated that the following descriptions are for illustrative purposes only and are not intended to limit the present disclosure. A number of specific details are described in the following description to provide a thorough understanding of the present disclosure. However, it is obvious for those skilled in the art that the present disclosure can be implemented without these specific details. In other instances, a detailed description of the known circuits, materials, or methods are omitted to avoid obscuring the subject matter of the present disclosure.

Throughout the description, the reference to "an embodiment", "embodiments", "an example" or "examples" means that the specific features, structures or characteristics described in relative to the embodiment(s) or example(s) are included in at least one of the embodiments disclosed in the description. Therefore, the phrases "in an embodiment", "in embodiments", "an example" or "examples" appeared throughout the description do not necessarily refer to the same embodiment(s) or example(s). In addition, specific features, structures or characteristics may be combined in one or more embodiments or examples in any appropriate combination and/or subcombination. In addition, those skilled in the art should understand that the drawings provided here are for illustrative purposes and are not necessarily drawn in scale. The term "and/or" used here includes any and all combinations of one or more pertinent listed items.

Figure 1:
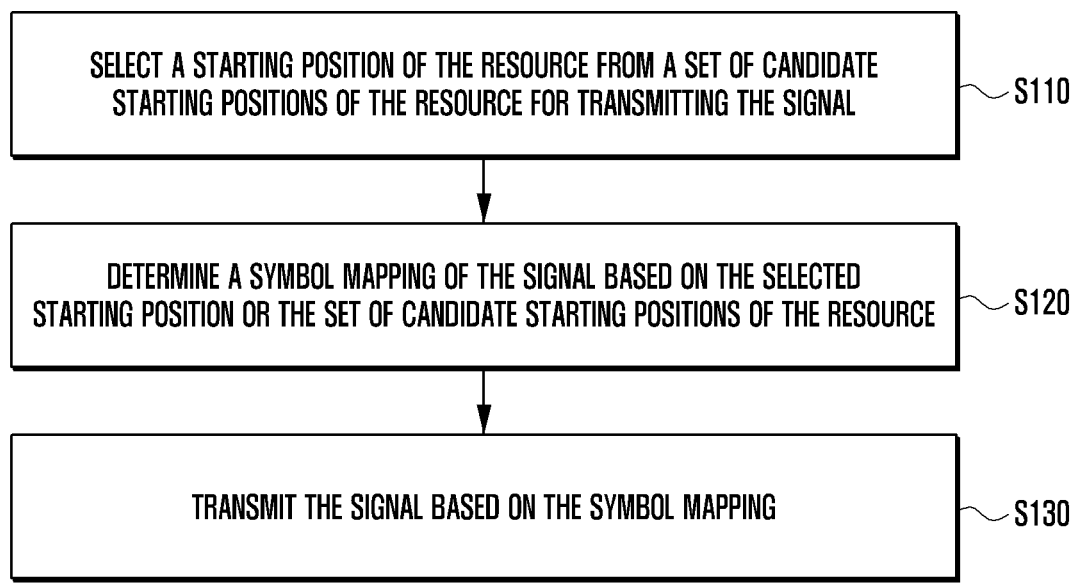
FIG. 1 illustrates an exemplary flow diagram of a method for transmitting a signal in accordance with an embodiment of the present invention.

FIG. 1 illustrates an exemplary flow diagram of a method for transmitting a signal in accordance with an embodiment of the present invention. As shown in FIG. 1, the method includes an optional operation S110 of selecting a starting position of the signal.

The signal may include, for example, a PUSCH, a PDSCH, or the like. The starting position of the resource may be selected by any feasible means, such as may be randomly selected, based on any predetermined rule, etc., and embodiments of the present invention are not limited by the specific selection rules. The starting position may be selected, for example, from the set of candidate starting positions, or may be selected by any other means, such as specified by a protocol or specification.

The method may comprise an operation S120 of determining a symbol mapping of the signal based on the selected starting position or the set of candidate starting positions of the signal.

In some embodiments, the signal may comprise a Physical Uplink Shared Control Channel (PUSCH) or a Physical Downlink Shared Control Channel (PDSCH), which may carry a Demodulation Reference Signal (DMRS). In this case, determining the symbol mapping of the signal based on the selected starting position or the set of candidate starting positions of the signal may include: determining that a starting position of the DMRS is located at a starting boundary of an OFDM symbol if a candidate starting position that is the last in the set of candidate starting positions is located at the starting boundary of the OFDM symbol; and determining that a starting position of the DMRS is located at a starting boundary of a first OFDM symbol after the OFDM symbol if a candidate starting position that is the last in the set of candidate starting positions is not located at the starting boundary of the OFDM symbol.

In some examples, the DMRS may comprise a plurality of groups of DMRSs, and a starting position of the DMRS is a starting position of a first group of DMRSs that are the earliest in the plurality of groups of DMRSs. In this case, the method shown in FIG. 1 may further comprise: determining positions of other groups of DMRSs in the plurality of groups of DMRSs with reference to the starting position of the first set of DMRSs based on an offset between positions of the plurality of groups of DMRSs.

In some embodiments, the signal comprises a PUSCH or a PDSCH which carries a Demodulation Reference Signal (DMRS), and the determining a symbol mapping of the signal based on a selected starting position or a set of candidate starting positions of the signal may comprise: positioning the DMRS within a first complete OFDM symbol after the selected starting position of the PUSCH, and wherein the starting position of the DMRS is located after an OFDM symbol in which a Listen Before Talk (LTB) detection succeeds.

In some embodiments, the signal may comprise a PUSCH or a PDSCH which may carry control information (e.g., UCI or DCI), and the determining a symbol mapping of the signal based on a selected starting position or a set of candidate starting positions of the signal may comprise: determining that a starting position of the control information is not earlier than a starting boundary of an OFDM symbol if a candidate starting position that is the last in the set of candidate starting positions is located at the starting boundary of the OFDM symbol; and determining that the starting position of the control information is not earlier than a starting boundary of a first OFDM symbol after the OFDM symbol if the candidate starting position that is the last in the set of candidate starting positions is not located at the starting boundary of the OFDM symbol.

In some examples, if the OFDM symbol including a starting position of the control information is occupied by a Demodulation Reference Signal (DMRS), the starting position of the control information is determined to be at a starting boundary of a first OFDM symbol that does not include the DMRS after the OFDM symbol that is occupied by the DMRS.

In some examples, if a subcarrier where the OFDM symbol including the starting position of the control information is located is occupied by a Demodulation Reference Signal (DMRS), the starting position of the control information is determined to avoid the subcarrier occupied by the DMRS.

In some examples, if the DMRS comprises a plurality of groups of DMRSs, the starting position of the control information is determined to be at a starting position of a first OFDM symbol that does not include the DMRS after an OFDM symbol that is occupied by a first group of DMRSs in the plurality of groups of DMRSs.

In some examples, the determining a symbol mapping of the signal based on a selected starting position or a set of candidate starting positions of the signal may comprise: determining a starting position of the DMRS and/or control information carried in the signal based on a subcarrier spacing and/or a cyclic prefix used to transmit the signal.

In some embodiments, the signal may comprise a PUSCH or a PDSCH, and the method illustrated in FIG. 1 may further comprise mapping the PUSCH to a scheduled slot; and dropping a portion of the PUSCH that is not mapped to the scheduled slot if the length of the PUSCH exceeds the number of symbols remaining in the scheduled slot.

The method may comprise an operation S130 of transmitting the signal based on the symbol mapping.

Figure 2:
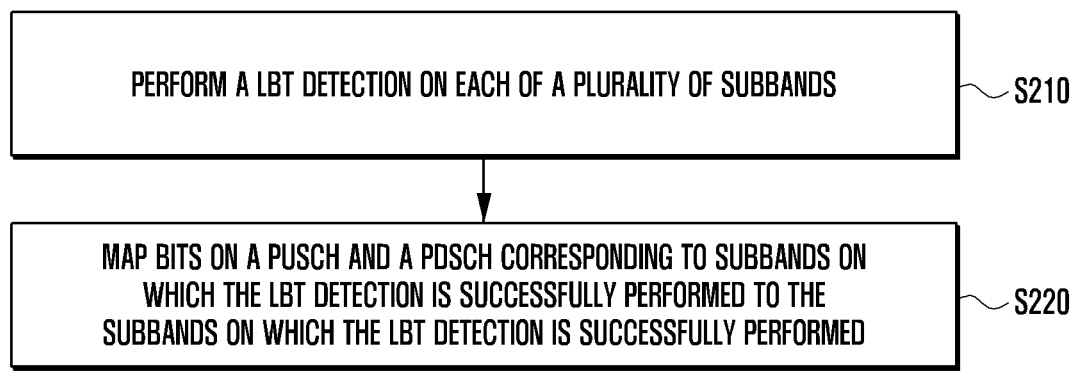
FIG. 2 shows an exemplary flow diagram of another method for transmitting a signal in accordance with an embodiment of the present invention.

FIG. 2 shows an exemplary flow diagram of another method for transmitting a signal in accordance with an embodiment of the present invention. In this method, the bandwidth (e.g., system bandwidth) that can be used to transmit a signal is divided into a plurality of subbands. As shown in FIG. 2, the method comprises an operation S210 of performing a Listen Before Talk (LBT) detection on each of the plurality of subbands for transmitting the signal.

The method may comprise an operation S220 of mapping bits on a Physical Uplink Shared Control Channel (PUSCH) and a Physical Downlink Shared Control Channel (PDSCH) corresponding to subbands on which the LBT detection is successfully performed to the subbands on which the LBT detection is successfully performed.

In some embodiments, bits of one coding block are mapped in one subband, or bits of one coding block group are mapped in one subband.

In some embodiments, the method illustrated in FIG. 2 may further comprise indicating to a receiving party the subband for transmitting the signal.

Figure 3:
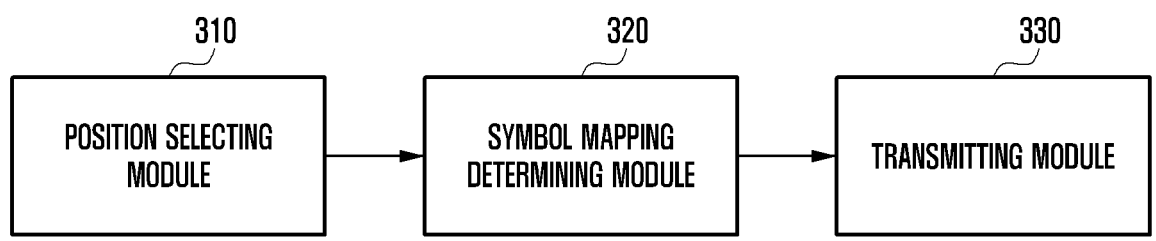
FIG. 3 shows an exemplary block diagram of an apparatus for transmitting a signal in accordance with an embodiment of the present invention.

FIG. 3 shows an exemplary block diagram of an apparatus for transmitting a signal in accordance with an embodiment of the present invention. As shown in FIG. 3, the apparatus includes a symbol mapping determining module 320 and a transmitting module 330. The symbol mapping determining module 320 is configured to determine a symbol mapping of the signal based on a selected starting position or a set of candidate starting positions of the signal. The transmitting module 330 is configured to transmit the signal based on the symbol mapping.

The apparatus may also include a position selecting module 310 configured to select a starting position of the signal. The starting position may be selected, for example, from the set of candidate starting positions, or may be selected by any other means, such as specified by a protocol or specification.

In some embodiments, the signal may comprise a PUSCH or a PDSCH which may carry a DMRS. In this case, the symbol mapping determining module 320 may be configured to determine that a starting position of the DMRS is located at a starting boundary of an OFDM symbol if a candidate starting position that is the last in the set of candidate starting positions is located at the starting boundary of the OFDM symbol; and determine that a starting position of the DMRS is located at a starting boundary of a first OFDM symbol after the OFDM symbol if a candidate starting position that is the last in the set of candidate starting positions is not located at the starting boundary of the OFDM symbol.

In some examples, the DMRS comprises a plurality of groups of DMRSs, and a starting position of the DMRS is a starting position of a first group of DMRSs that are the earliest in the plurality of groups of DMRSs. In this case, the symbol mapping determining module 320 may be further configured to determine positions of other groups of DMRSs in the plurality of groups of DMRSs with reference to the starting position of the first set of DMRSs based on an offset between positions of the plurality of groups of DMRSs.

In some examples, the starting position of the DMRS may be located after an OFDM symbol for which a LBT detection succeeds.

In some embodiments, the signal may comprise a PUSCH or a PDSCH which may carry a Demodulation Reference Signal (DMRS), and the symbol mapping determining module 320 may be further configured to: position the DMRS within a first complete OFDM symbol after the selected starting position of the PUSCH, and wherein the starting position of the DMRS is located after an OFDM symbol in which a Listen Before Talk (LTB) detection succeeds.

In some embodiments, the signal may comprise a PUSCH or a PDSCH which may carry control information, and the symbol mapping determining module 320 may be configured to: determine that a starting position of the control information is not earlier than a starting boundary of an OFDM symbol if a candidate starting position that is the last in the set of candidate starting positions is located at the starting boundary of the OFDM symbol; and determine that the starting position of the control information is not earlier than a starting boundary of a first OFDM symbol after the OFDM symbol if the candidate starting position that is the last in the set of candidate starting positions is not located at the starting boundary of the OFDM symbol.

In some examples, if the OFDM symbol including the starting position of the control information is occupied by a Demodulation Reference Signal (DMRS), the starting position of the control information is determined to be at a starting boundary of a first OFDM symbol that does not include the DMRS after the OFDM symbol that is occupied by the DMRS.

In some examples, if a subcarrier where the OFDM symbol including the starting position of the control information is located is occupied by a Demodulation Reference Signal (DMRS), the starting position of the control information is determined to avoid the subcarrier occupied by the DMRS.

In some examples, if the DMRS comprises a plurality of groups of DMRSs, the starting position of the control information is determined to be at a starting position of a first OFDM symbol that does not include the DMRS after an OFDM symbol that is occupied by a first group of DMRSs in the plurality of groups of DMRSs.

In some examples, the symbol mapping determining module 320 may be configured to determine a starting position of the DMRS and/or control information carried in the signal based on a subcarrier spacing and/or a cyclic prefix used to transmit the signal.

In some embodiments, the signal may comprise a PUSCH or PDSCH, and the symbol mapping determining module 320 may be further configured to map the PUSCH to a scheduled slot; and drop a portion of the PUSCH that is not mapped to the scheduled slot if the length of the PUSCH exceeds the number of symbols remaining in the scheduled slot.

Figure 4:
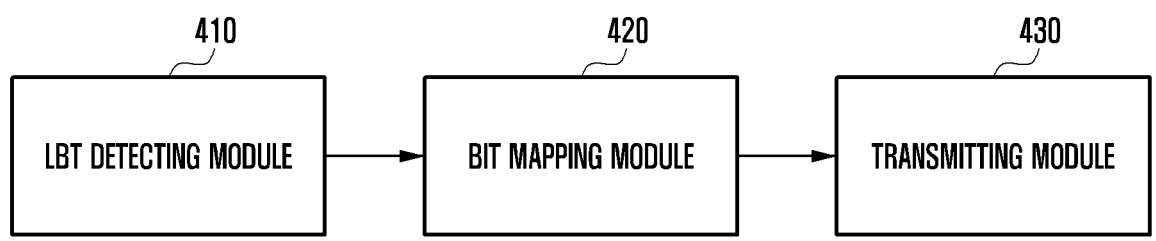
FIG. 4 shows an exemplary block diagram of another apparatus for transmitting signals in accordance with an embodiment of the present invention.

FIG. 4 shows an exemplary block diagram of another apparatus for transmitting a signal in accordance with an embodiment of the present invention. In the solution shown in FIG. 4, the bandwidth that can be used to transmit the signal is divided into a plurality of subbands. As shown in FIG. 4, the apparatus may comprise an LBT detecting module 410 and a bit mapping module 420. The LBT detecting module 410 is configured to perform a Listen Before Talk (LBT) detection on each of a plurality of subbands for transmitting the signal, respectively. The bit mapping module 420 is configured to map bits on a Physical Uplink Shared Control Channel (PUSCH) and a Physical Downlink Shared Control Channel (PDSCH) corresponding to subbands on which the LBT detection is successfully performed to the subbands on which the LBT detection is successfully performed.

In some embodiments, bits of one coding block may only be mapped in one subband, or bits of one coding block group may only be mapped in one subband.

In some embodiments, the apparatus shown in FIG. 4 may further comprise a transmitting module 430 configured to indicate to a receiving party the subband for transmitting the signal.

The technical solutions shown in FIGS. 1 to 4 are explained below based on specific implementation examples. It should be noted that although the following example illustrates the technical solution of the embodiment of the present invention mainly based on the uplink (for example, PUSCH and UCI), the solution is also applicable to the downlink (for example, PDSCH and DCI). Further, unless the plurality of groups of DMRSs are included in the examples, the term "first group of DMRSs" in the following examples may also refer to one group of DMRSs in the case that there is only that one group of DMRSs.

Embodiment 1

In some scenarios, a transmitting node A may be unaware of a starting point of a transmitted signal before transmitting the signal because for example, the starting point of the transmission depends on the result of the LBT. The receiving node B may also be unable to determine the starting point of the signal when receiving the signal transmitted by the transmitting node A. For example, the starting point of transmission may be randomly selected from a set of transmission starting points or determined according to the LBT result of the transmitting party. In order for the receiving node B to be able to demodulate the signal without knowing the starting point of the signal, the position of the reference signal in the transmitted signal is required to be relatively fixed. Alternatively, the position of the reference signal is not fixed, but the position of the reference signal belongs to a predefined set of possible positions, and the base station can receive the reference signal by performing a blind detection in this set. If the receiving node B needs to demodulate the transmitted signal according to the UCI in the transmitted signal, the position of the UCI is also required to be relatively fixed. Moreover, if the transmitting node A can transmit the reference signal and/or the UCI as completely as possible at any possible starting position, it also helps the receiving node B to correctly demodulate the transmitted signal.

In addition, for transmissions where the transmission starting point is definite and the transmission starting point is uncertain, different reference signal processing methods can be used to improve the transmission efficiency of the reference signal.

The position of the reference signal in the transmitted signal may be determined according to at least one of the following manners:

(1) The starting point of the first group of DMRSs is determined based on the last starting position $P_{start}$ in the set of possible starting position positions.

In the description herein, the possible starting positions are also referred to as candidate starting positions, both of which are used interchangeably.

If $P_{start}$ is not located at the starting boundary of an OFDM symbol, for example, within the OFDM symbol, assuming that the index of the OFDM symbol in which $P_{start}$ is located is $O_{p\_start}$, the starting point of the first group of DMRSs is at the starting boundary of the symbol $O_{p\_start+1}$.

If $P_{start}$ is located at the starting boundary of the OFDM symbol, assuming that the index of the OFDM symbol in which $P_{start}$ is located is $O_{p\_start}$, the starting point of the first group of DMRSs is at the starting boundary of the symbol $O_{p\_start}$.

Preferably, the first group of DMRSs are those that are earliest in the PUSCH or the PUCCH. The first group of DMRSs may occupy 1 symbol, 2 symbols, or any other number of symbols.

Preferably, if the base station configures only one group of DMRSs for the UE, the position of the group of DMRSs is determined according to $P_{start}$. If a plurality of groups of DMRSs are configured, they may be determined according to existing methods or other methods.

Preferably, if the mapping manner of the DMRS configured by the base station is mode A (type A DMRS), the first group of DMRSs fixedly starts from the configured symbol, for example, the third or fourth symbol. If the mapping mode of the DMRS configured by the base station is mode B (type B DMRS), the starting position of the first group of DMRSs is determined according to $P_{start}$. In the prior art, type B DMRS indicates that the first group of DMRSs is located at the first symbol that actually transmits the PUSCH.

Preferably, if the base station configures a plurality of groups of DMRSs for the UE, the position of the first group of DMRSs is determined according to $P_{start}$, and positions of other groups of DMRSs are determined with reference to the position of the first set of DMRSs based on a predefined offset. For example, assume that the base station configures two groups of DMRSs for the UE, each group of DMRSs includes one symbol, and the interval between the two groups of DMRSs is 4 symbols. For example, the first group of DMRSs is located at symbol #1, and the second group of DMRSs is located at #5.

Preferably, when the mapping mode of the DMRS configured by the base station is mode B, and the base station configures a plurality of groups of DMRSs for the UE, the symbol positions of the plurality of groups of DMRSs may be determined according to the method described above.

Figure 5:
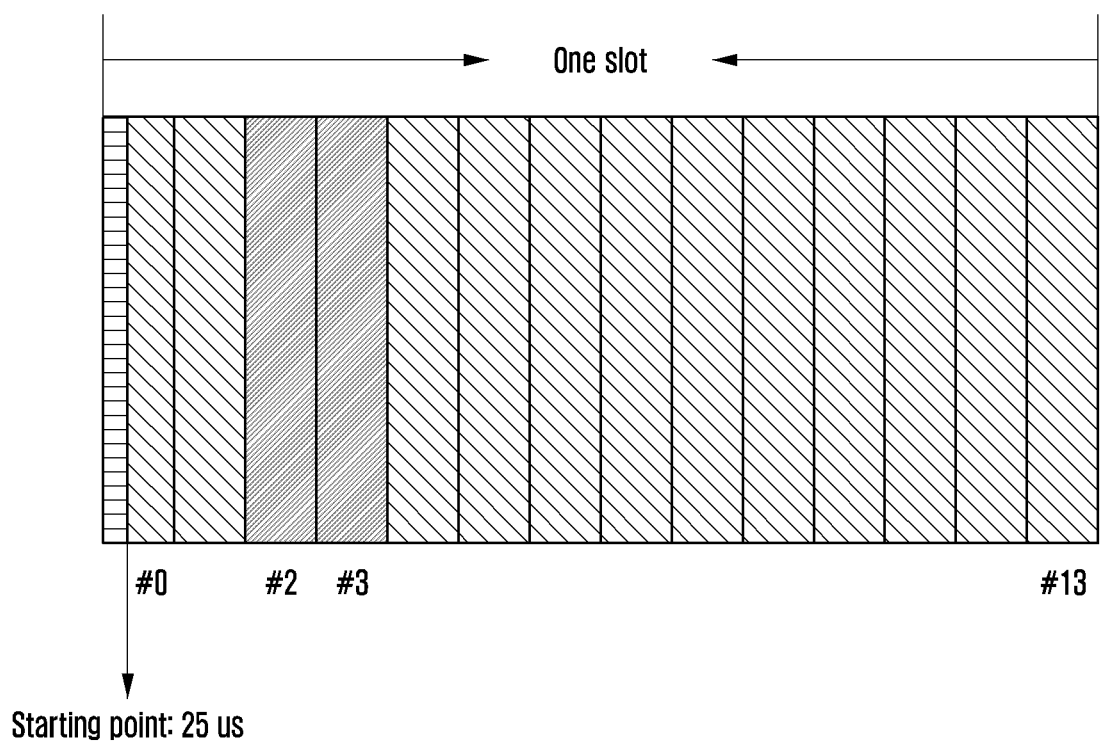
FIG. 5 shows an example of a symbol mapping in accordance with an embodiment of the present invention.

FIG. 5 shows an example of a symbol mapping in accordance with an embodiment of the present invention. As shown in FIG. 5, assume that the set $S_p$ of possible starting points of the PUSCH is {0 us, 16 us, 25 us, 34 us, 43 us, 52 us, 61 us, 70 us}. Assume that the subcarrier spacing (SCS) is 30 kHz, the locations of respective starting points in the set $S_p$ are {the starting boundary of #$O_0$, within #$O_0$, within #$O_0$, the starting boundary of #$O_1$, within #$O_1$, within #$O_1$, within #$O_1$, the starting boundary of #$O_2$}, where #Oi represents OFDM symbol #i. $P_{start}$=70 us=the starting boundary of #$O_2$. Before transmitting the PUSCH, the UE randomly selects a starting point from the set $S_p$, for example, 25 us, that is, within #$O_0$. Assuming that the first group of DMRSs configured by the base station for the UE includes 2 symbols, the first symbol of the first group of DMRSs is determined according to $P_{start}$, that is, symbol #$O_2$, and the second symbol is symbol #$O_3$. The PUSCH starts mapping from the position at 25 us.

Figure 6:
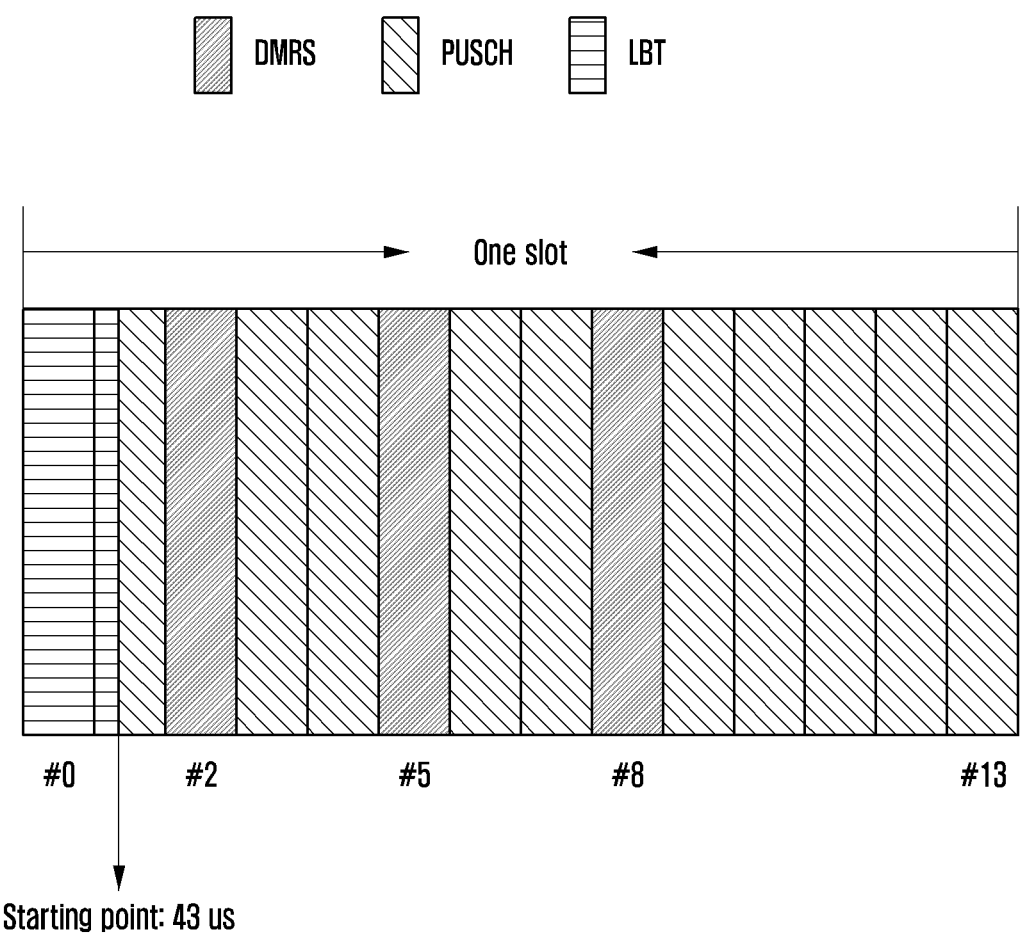
FIG. 6 shows an example of a symbol mapping in accordance with an embodiment of the present invention.

FIG. 6 shows an example of a symbol mapping in accordance with an embodiment of the present invention. As shown in FIG. 6, assume that the set $S_p$ of possible starting positions of the PUSCH is {0 us, 16 us, 25 us, 34 us, 43 us, 52 us, 61 us, 70 us}. Assume that SCS is 30 KHz, the symbols where the locations of respective starting points in the set $S_p$ are {the starting boundary of #$O_0$, within #$O_0$, within #$O_0$, the starting boundary of #$O_1$, within #$O_1$, within #$O_1$, within #$O_1$, the starting boundary of #$O_2$}, where #$O_i$ represents OFDM symbol #i. Before transmitting the PUSCH, the UE randomly selects a starting point from the set $S_p$, for example, 43 us, that is, within #$O_1$. Assume that the base station configures three groups of DRMS for the UE, each group of DMRSs includes 1 symbol, and each group of DMRSs is separated by 3 symbols. Then, the symbol of the first group of DMRSs is symbol #$O_2$, the symbol of the second group of DMRSs is symbol #$O_5$, and the symbol of the third group of DMRSs is symbol #$O_8$.

(2) The first group of DMRSs is located within the first complete OFDM symbol.

For example, the set $S_p$ of possible starting positions of the PUSCH is {the starting boundary of #$O_0$, within #$O_0$, within #$O_0$, the starting boundary of #$O_1$, within #$O_1$, within #$O_1$, within #$O_1$, the starting boundary of #$O_2$}. Assume that the starting point of the PUSCH actually transmitted is at 43 us, that is, within #$O_1$. Then, the first group of DMRSs is located at symbol #$O_2$. For another example, if the starting point of the PUSCH actually transmitted is at 34 us, that is, the starting boundary of #$O_1$, the first group of DMRSs is located at symbol #$O_1$.

Thus, the base station can detect the DMRS in symbols that may include the DMRS.

When the starting point of the transmitted signal is definite, for example, the base station instructs the UE to start transmitting the PUSCH at a certain time, it may also be defined that the first group of DMRSs is located within the first complete OFDM symbol.

Preferably, if the mapping mode of the DMRS configured by the base station is mode A, the first group of DMRSs fixedly starts from the configured symbol, for example, the third or fourth symbol. If the mapping mode of the DMRS configured by the base station is mode B, the first group of DMRSs is located within the first complete OFDM symbol.

Figure 7:
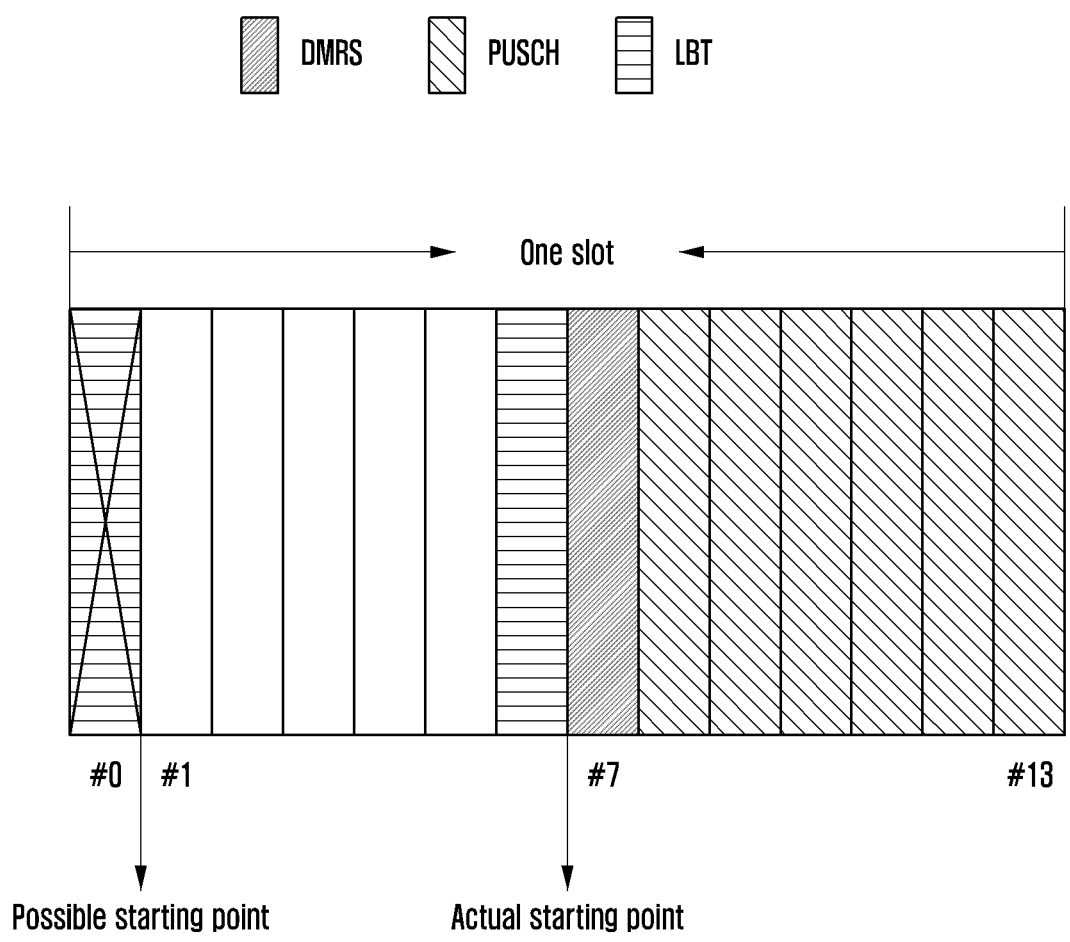
FIG. 7 shows an example of a symbol mapping in accordance with an embodiment of the present invention.

Preferably, in the case that the mapping mode of the DMRS configured by the base station is mode B, if the base station configures a plurality of groups of DMRSs for the UE, but the position of the DMRS goes beyond the slot boundary, the DMRS is not sent. FIG. 7 shows an example of a symbol mapping in accordance with an embodiment of the present invention. As shown in FIG. 7, the UE may start transmitting the PUSCH at symbol #1 or symbol #7 according to the result of the LBT. The base station configures typeB DMRS, and configures 2 groups of DMRSs, and the interval between the two groups of DMRSs is 8 symbols. The UE does not successfully complete the LBT before symbol #1, and completes the LBT before symbol #7. Then the UE starts transmitting the PUSCH at symbol #7, where symbol #7 includes the first group of DMRSs. Since the second group of DMRSs is located at symbol #15, i.e., the second symbol of the next slot, the second group of DMRSs is not transmitted.

Preferably, if the base station configures a plurality of groups of DMRSs for the UE, the position of the first group of DMRS positions is determined according to the actual starting point of the PUSCH, and the positions of the other groups of DMRSs other than the first group of DMRSs are determined according to the starting point and length of the PUSCH indicated by the base station. For example, the base station indicates that the starting point of the PUSCH that the UE is expected to transmit is at symbol #1, the length of the PUSCH is 10 symbols, and configures two groups of DMRSs for the UE, and the second group of DMRSs are at symbol #8 in the PUSCH that is expected to be transmitted, that is, Symbol #9 in the slot. If the starting point of the PUSCH actually transmitted by the UE after completing the LBT is at symbol #2, and the actual length of the PUSCH is 9 symbols, the UE still determines the position of the second group of DMRSs according to the 10 symbols and the starting boundary of symbol #1, that is, Symbol #9 in the slot. If the first group of DMRSs overlap with other groups of DMRSs, the overlapped other groups of DMRSs are dropped and the first group of DMRSs are transmitted. For example, the base station indicates that the starting point of the PUSCH that the UE is expected to transmit is at symbol #1, the length of the PUSCH is 8 symbols, configures two groups of DMRSs for the UE, and the second group of DMRSs are at symbol #6 in the PUSCH that is expected to be transmitted, that is, Symbol #7 in the slot. The UE may start transmitting the PUSCH at symbol #1 or symbol #7 according to the result of the LBT. The UE does not successfully complete the LBT before symbol #1, and completes the LBT before symbol #7, then transmits the PUSCH starting from symbol #7, where symbol #7 includes the first group of DMRSs. Therefore, the first group of DMRSs completely overlaps with the second group of DMRSs, and the UE transmits only the first group of DMRSs.

Preferably, the method described above is also applicable to the downlink transmission.

The mapping position of the UCI in the transmitted signal can be determined according to at least one of the followings:

(3) The starting point of the UCI is not earlier than a symbol where the last starting position $P_{start}$ of the set of candidate starting positions $S_p$ is located.

If $P_{start}$ is not located at the starting boundary of an OFDM symbol, assuming that the index of the OFDM symbol where $P_{start}$ is located is $O_{p\_start}$, the starting point of the UCI is not earlier than the starting boundary of symbol $O_{p\_start+1}$. Preferably, the starting point of the UCI is the starting boundary of the symbol $O_{p\_start+1}$. Preferably, if symbol $O_{p\_start+1}$ does not include the DMRS, the starting point of the UCI is at the starting boundary of the symbol $O_{p\_start+1}$, otherwise the starting point of the UCI is at the starting boundary of the first symbol that does not include the DMRS after the DMRS symbol (ie, symbol $O_{p\_start+1}$). For example, if the first group of DMRSs are located at symbol $O_{p\_start+1}$ and symbol $O_{p\_start+2}$, the mapping starting point of the UCI is at the symbol $O_{p\_start+3}$.

If $P_{start}$ is located at the starting boundary of the OFDM symbol, assuming that the index of the OFDM symbol where $P_{start}$ is located is $O_{p\_start}$, the starting point of the UCI is not earlier than the starting boundary of symbol #$O_{p\_start}$. Preferably, the starting point of the UCI is at the starting boundary of symbol $O_{p\_start}$.

Preferably, if symbol $O_{p\_start}$ does not include a DMRS, the starting point of the UCI is at the starting boundary of symbol $O_{p\_start}$, otherwise the starting point of the UCI is at the starting boundary of the first symbol that does not include the DMRS after the DMRS symbol (i.e., $O_{p\_start}$).

Preferably, the UCI shall avoid symbols including a DMRS.

Preferably, the UCI shall avoid subcarriers including a DMRS. For example, the UCI may be mapped to a symbol including a DMRS, but may not be mapped to a subcarrier in the symbol on which the DMRS is located.

Figure 8:
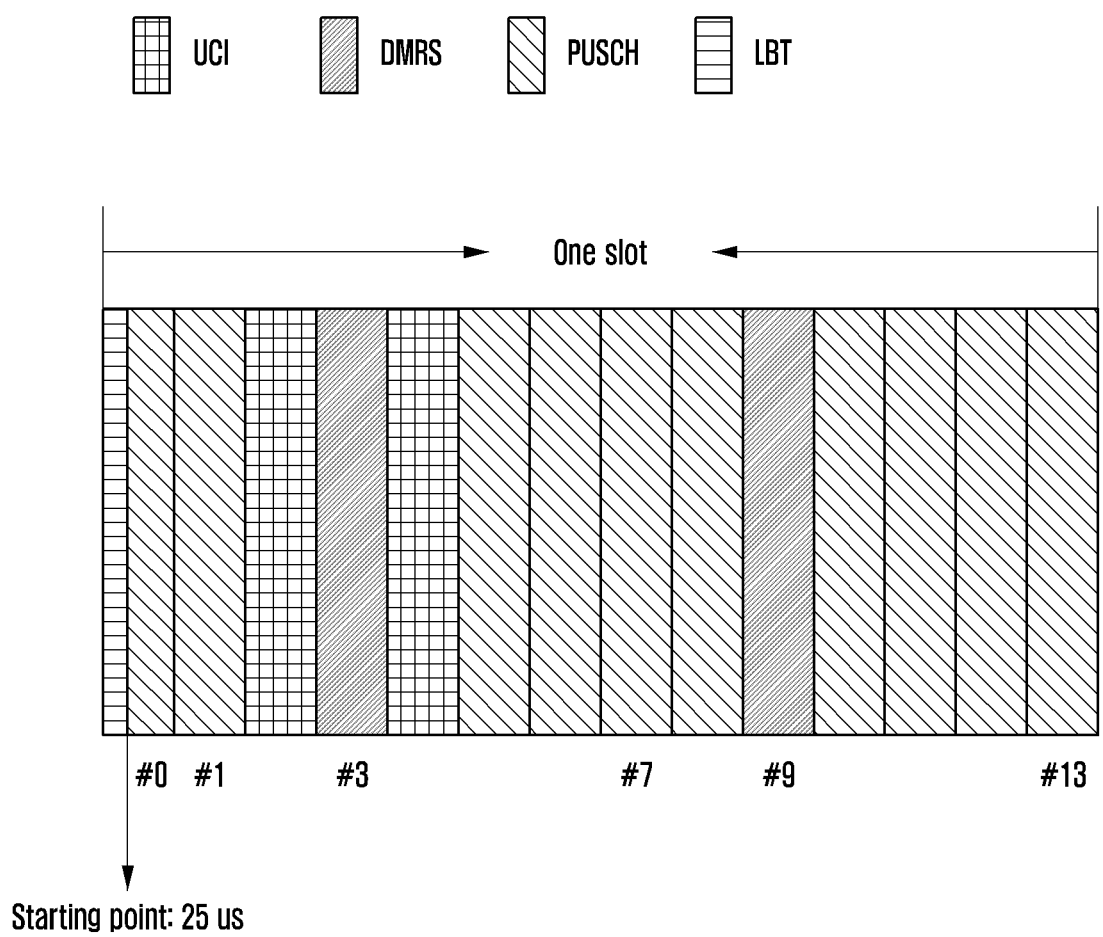
FIG. 8 shows an example of a symbol mapping in accordance with an embodiment of the present invention.

FIG. 8 shows an example of a symbol mapping in accordance with an embodiment of the present invention. As shown in FIG. 8, assume that the base station configures type A DMRS, and two groups of DMRSs, the two groups of DMRSs being located at symbol #$O_3$ and symbol #$O_9$. The locations of respective starting points in the set $S_p$ are {the starting boundary of #$O_0$, within #$O_0$, within #$O_0$, the starting boundary of #$O_1$, within #1, within #$O_1$, within #$O_1$, the starting boundary of #$O_2$}. Before transmitting the PUSCH, the UE randomly selects a starting point from the set Sp, 25 us, that is, within #$O_0$. The last starting point $P_{start}$ in the set $S_p$ of candidate starting positions is the starting boundary of #$O_2$. The UCI is mapped from the first symbol that does not include the DMRS after the starting boundary of symbol #$O_2$, that is, mapped from #$O_2$, avoiding symbol #$O_3$ and symbol #$O_9$.

(4) The starting point of the UCI is not earlier than the first symbol of the first group of DMRSs.

Preferably, the position of the first group of DMRSs may be determined according to the manner of (1) or (2).

Figure 9:
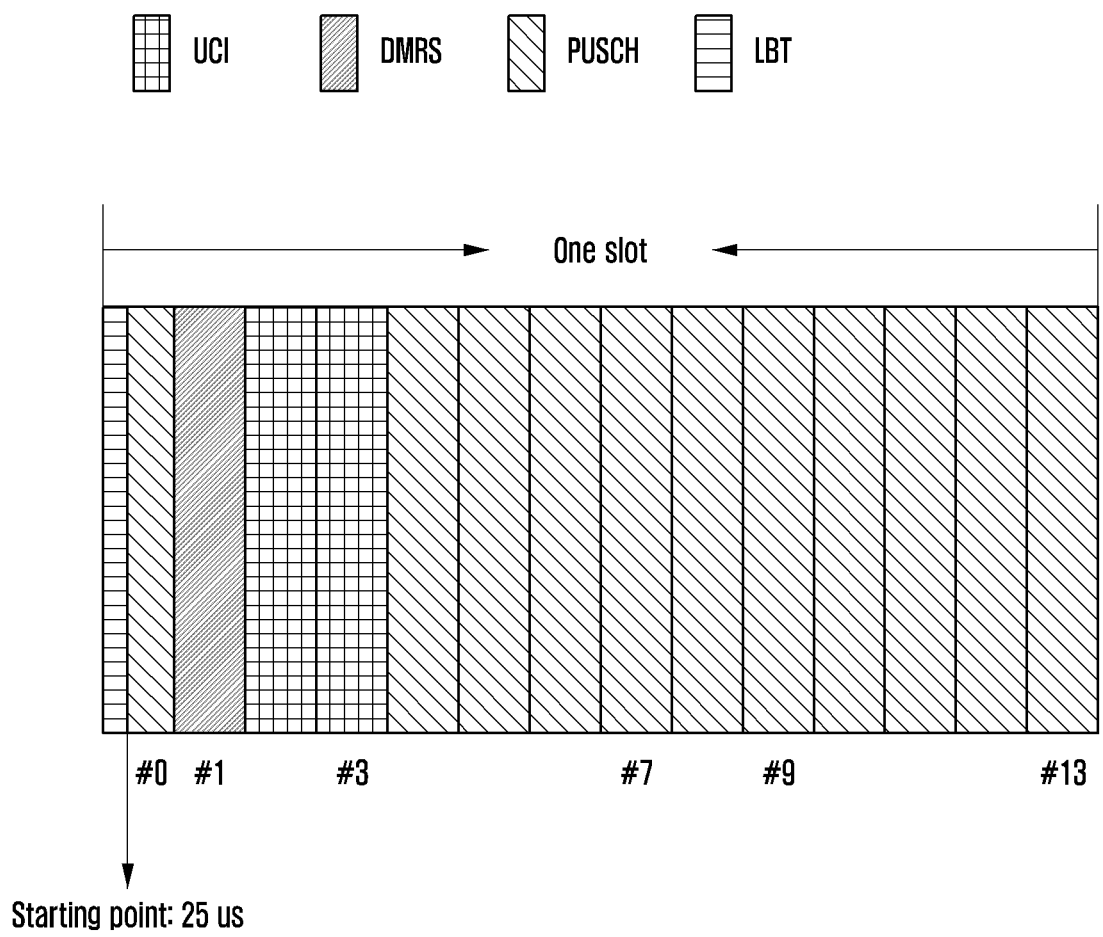
FIG. 9 shows an example of a symbol mapping in accordance with an embodiment of the present invention.

FIG. 9 shows an example of a symbol mapping in accordance with an embodiment of the present invention. As shown in FIG. 9, assume that the base station configures type A DMRS and one group of DMRSs. The actual starting position of the PUSCH is at 25 us, and the first group of DMRSs is located in the first complete symbol of the PUSCH, that is, symbol $\#O_1$. Then, UCI starts mapping from symbol $\#O_2$.

Figure 10:
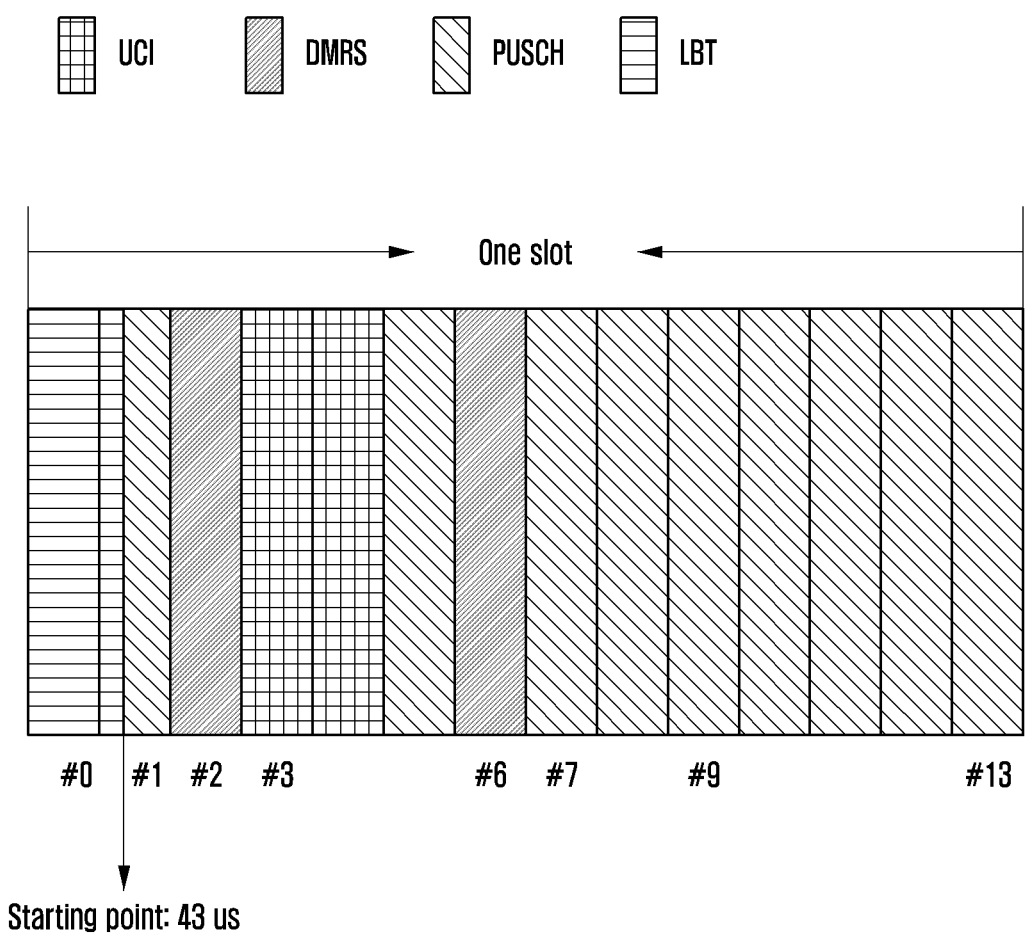
FIG. 10 shows an example of a symbol mapping in accordance with an embodiment of the present invention.

FIG. 10 shows an example of a symbol mapping in accordance with an embodiment of the present invention. As shown in FIG. 10, assume that the base station configures type B DMRS and two groups of DMRSs, and the two groups of DMRSs are separated by 4 symbols. The symbols where the locations of respective starting points in the set $S_p$ are {the starting boundary of $\#O_0$, within $\#O_0$, within $\#O_0$, the starting boundary of $\#O_1$, within $\#O_1$, within $\#O_1$, within $\#O_1$, the starting boundary of $\#O_2$}. Before transmitting the PUSCH, the UE randomly selects a starting point, 43 us, that is, within $\#O_1$, from the set $S_p$. Then, the first group of DMRSs is located at symbol $\#O_2$ and symbol $\#O_6$, and the UCI is mapped from the first symbol after the end of the first group of DMRSs, that is, mapped from symbol $\#O_3$, avoiding symbol $\#O_6$.

Preferably, the UCI may be a UCI including HARQ-ACK and/or CSI. Preferably, the UCI may be a UCI including PUSCH demodulation information (e.g., actual starting and ending positions of the PUSCH, HARQ information of the PUSCH, UE ID, etc.).

Preferably, if the UCI includes both HARQ-ACK and/or CSI information and PUSCH demodulation information, the two types of UCI information are self-encoded. Preferably, if the UCI includes both HARQ-ACK and/or CSI information and PUSCH demodulation information, the base station may separately configure β_offset for determining the number of time-frequency resources occupied by the UCIs for different types of UCI information.

Preferably, if the UCI includes both HARQ-ACK and/or CSI information and PUSCH demodulation information, the HARQ-ACK and/or CSI information and the PUSCH demodulation information are respectively mapped to physical resources. For example, the HARQ-ACK information is mapped to a first symbol that is not occupied by the DMRS after the first DMRS, and the CSI information is mapped to the first complete symbol not occupied by the DMRS and avoids the resources that may be occupied by HARQ-ACK. The PUSCH demodulation information is mapped to the first complete symbol that is not occupied by the DMRS and avoids resources that may be occupied by the HARQ-ACK and the CSI information. For another example, the PUSCH demodulation information is mapped to a first symbol that is not occupied by the DMRS after the first DMRS, and the HARQ-ACK information is mapped to the first complete symbol that is not occupied by the DMRS and avoids the resources that may be occupied by the PUSCH demodulates information. The CSI information is mapped to the first complete symbol that is not occupied by the DMRS and avoids resources that may be occupied by the PUSCH demodulation information and the HARQ-ACK information. Preferably, the UCI is mapped so that it spreads as evenly as possible over the entire band resource occupied by the PUSCH. For example, the UCI information can be equally mapped onto a portion of the subcarriers within a symbol according to a predefined pattern or rule.

Preferably, the UCI mapping resource position including the PUSCH demodulation information does not depend on the total number of bits of the HARQ-ACK. For example, as in the above example, the UCI including the PUSCH demodulation information is first mapped, and then the HARQ-ACK is mapped. In the UCI including the PUSCH demodulation information, information for determining the number of HARQ-ACK bits may also be included. For example, similar to the UL DAI included in the UL grant in the prior art, the UL DAI is included in the UCI for the base station to determine the total number of bits of the HARQ-ACK transmitted by the UE in the PUSCH. Preferably, if the UE is configured with a HARQ-ACK codebook with a predefined size or a semi-statically configured size, the UL DAI may be 1 bit, indicating whether the UE sends a HARQ-ACK codebook in the PUSCH. If the UL DAI indicates that the UE has transmitted the HARQ-ACK, the HARQ-ACK codebook is determined according to the predefined size or semi-statically configured size. Preferably, if the UE is configured with a dynamic codebook, the UL DAI may be 2 or 3 or 4 bits, indicating the size of the HARQ-ACK codebook, and the base station determines the total number of HARQ-ACK bits transmitted by the UE according to the HARQ-ACK feedback information (for example, DL DAI in the DL DCI) for the scheduled PDSCH and the received UL DAI transmitted by the UE.

Preferably, the physical resources occupied by the UCI are determined according to physical resources occupied by the PUSCH that is determined by predefined PUSCH starting and ending points. For example, the physical resources occupied by the PUSCH are determined according to a starting point that is the earliest in a set of PUSCH starting points that is configured by the base station or predefined and an ending point that is the last in a set of PUSCH ending points.

Preferably, the physical resources occupied by the UCI are determined according to MCS information of the PUSCH indicated in the predefined or higher layer configuration or activation DCI of the uplink transmission. For example, after receiving the activation signaling, the UE starts to make an attempt on sending an automatic or configured grant-based PUSCH. The MCS information of the PUSCH is indicated in the activation signaling, and the UE may adjust the MCS by itself in the subsequent PUSCH transmission, and notify the base station by using the UCI information. Generally, the physical resources occupied by the UCI carried by the PUSCH are determined according to the MCS information of the data of the PUSCH, such as the TB size and the number of physical resources occupied by the PUSCH. However, the base station is required to determine the information on the physical resources occupied by the UCI according to a certain assumption because the UE may determine the MCS information by itself but the base station is unaware of the MCS information when demodulating the UCI. Preferably, the UCI information including the PUSCH demodulation information determines the physical resources to be occupied according to the assumed MCS information. Preferably, the UCI information including the HARQ-ACK and/or the CSI determines the physical resource to be occupied according to the assumed MCS information, or determines the physical resource to be occupied according to the actual MCS information of the PUSCH. For example, the UCI information including the HARQ-ACK information and the PUSCH demodulation information determines the physical resources to be occupied according to the assumed MCS information, and the HARQ-ACK information is mapped to the first symbol that is not occupied by the DMRS after the first DMRS. The PUSCH demodulation information is mapped to the first complete symbol that is not occupied by the DMRS and avoids resources that may be occupied by the HARQ-ACK, and the CSI information is mapped to the first complete symbol that is not occupied by the DMRS and avoids resources that may be occupied by the HARQ-ACK and the PUSCH demodulation information. The base station may determine the physical resources occupied by the CSI information after the PUSCH demodulation information is decoded.

Preferably, the PUSCH demodulation information includes indication information indicating a coding block group (CBG). For example, it indicates that the current PUSCH transmission includes which CBGs in one TB.

Preferably, the PUSCH is a PUSCH transmitted by the GUL. Preferably, the PUSCH is a PUSCH transmitted by the SUL.

Preferably, the above method is only applicable to the case where the receiving party cannot determine the actual starting point and/or ending point before receiving the transmitting signal. If the receiving party already knows the starting point before receiving, for example, the base station is the receiving party of the PUSCH and the unique starting point of the PUSCH is configured by the base station, the DMRS may start mapping from a first complete symbol after the starting point. For example, the base station indicates that the starting point of the PUSCH is at 25 us later than the starting boundary of the fifth symbol of the slot n, and indicates that the PUSCH is a PUSCH of Type B, that is, the DMRS is located at the starting position of the PUSCH. The DMRS of the PUSCH does not start mapping from the 5th symbol, but from the 6th symbol, because the 5th symbol is an incomplete symbol, which would affect the DMRS channel estimation performance. And, the UCI can start mapping from the first complete symbol that does not include the DMRS after the starting point, for example, mapping the CSI from symbol 7.

If the PUSCH including UCI has multiple possible ending points, the set of ending point is denoted as Se, and the ending point that is the earliest in the set is denoted as Pena. Then, the ending position of the UCI is no later than the symbol Pena. For example, in some scenarios, at least 25 us must be vacated in the last slot of the uplink transmission so that the base station can perform an LBT of 25 us in this gap. When the SCS is 60 kHz, the PUSCH needs to vacate 2 symbols in the last slot. In other cases, the PUSCH may only need to vacate 1 symbol, such as 1 symbol of SRS, or do not need to vacate the symbol. Then, the set Se of end points is $\{\#O_{12}, \#O_{13}, \#O_{14}\}$, and the UCI mapping needs to end at symbol $\#O_{12}$.

Preferably, if the UCI mapping is performed in the time domain first and in the frequency domain later, the UCI mapping starts from the starting point of the UCI mapping to the last symbol in the first available RB in the time domain, and then to the next RB.

Preferably, if the UCI mapping is performed in the frequency domain first and in the time domain later, the UCI mapping starts from the starting point of the UCI mapping, from the first available RB to the last available RB, and then to the next symbol.

In an embodiment, if the starting point of the signal to be transmitted by the transmitting node A is related to the Subcarrier Spacing (SCS) or the Cyclic Prefix (CP) of the transmitted signal (collectedly referred to as numerology), the position of the symbol where the reference signal and/or UCI information is located may be determined according to different numerologies. E.g.

TABLE 1

| | Numerology 1 SCS = 15 KH, normal CP | Numerology 2 SCS = 30 KH, normal CP | Numerology 3 SCS = 60 KH, normal CP |
| --- | --- | --- | --- |
| possible starting points of PUSCH {16 us, 25 us, 34 us, 43 us, 52 us, 61 us, 70 us} | locations of possible starting points of PUSCH {within #0, within #0, within #0, within #0, within #0, within #0, starting boundary of #1} | locations of possible starting points of PUSCH {within #0, within #0, starting boundary of #1, within #1, within #1, within #1, starting boundary of #2} | locations of possible starting points of PUSCH {within #0, starting boundary of #1, within #1, starting boundary of #2, within #2, within #2, starting boundary of #3} |
| starting point of the first group of DMRSs | starting boundary of #1 | starting boundary of #2 | starting boundary of #3 |
| starting point of UCI | starting boundary of #2 | starting boundary of #3 | starting boundary of #4 |
| possible ending points of PUSCH{end of a slot, end of a slot −25 us, last but one symbol} | {#13, #12, #12} | {#13, #12, #12} | {#13, #11, #12} |
| the symbol where the ending point of UCI is located | #12 | #12 | #11 |

The mapping manner of the transmitted signal PUSCH may be determined according to at least one of the following manners:

(1) The UE maps the PUSCH prepared in advance from the selected starting point of the actual transmission. The UL grant scheduling the PUSCH only indicates the length of the PUSCH, and does not need to indicate the starting point of the PUSCH, and the UE maps the first symbol of the PUSCH prepared in advance to the starting point of the actual transmission. If the indicated length of the PUSCH exceeds the number of symbols remaining in the scheduled slot, the remaining part of the PUSCH is dropped; or the UE does not determine from which symbol of the PUSCH prepared in advance to start mapping according to the indicated PUSCH starting point, but fixedly maps the first symbol of the PUSCH prepared in advance to the starting point of the actual transmission. If the indicated length of the PUSCH exceeds the number of symbols remaining in the scheduled slot, the remaining part of the PUSCH is dropped.

Preferably, the base station may indicate, by using a high-layer configuration, a UL grant dynamic indication, or a predefined manner, whether the UE performs PUSCH mapping according to the manner described above, or prepares the PUSCHs in advance according to the starting position indicated in the UL grant, and starts to transmit the PUSCH in those prepared in advance that correspond to the starting point of the actual transmission of the UE and the subsequent PUSCHs from the starting point of the actual transmission.

Figure 11:
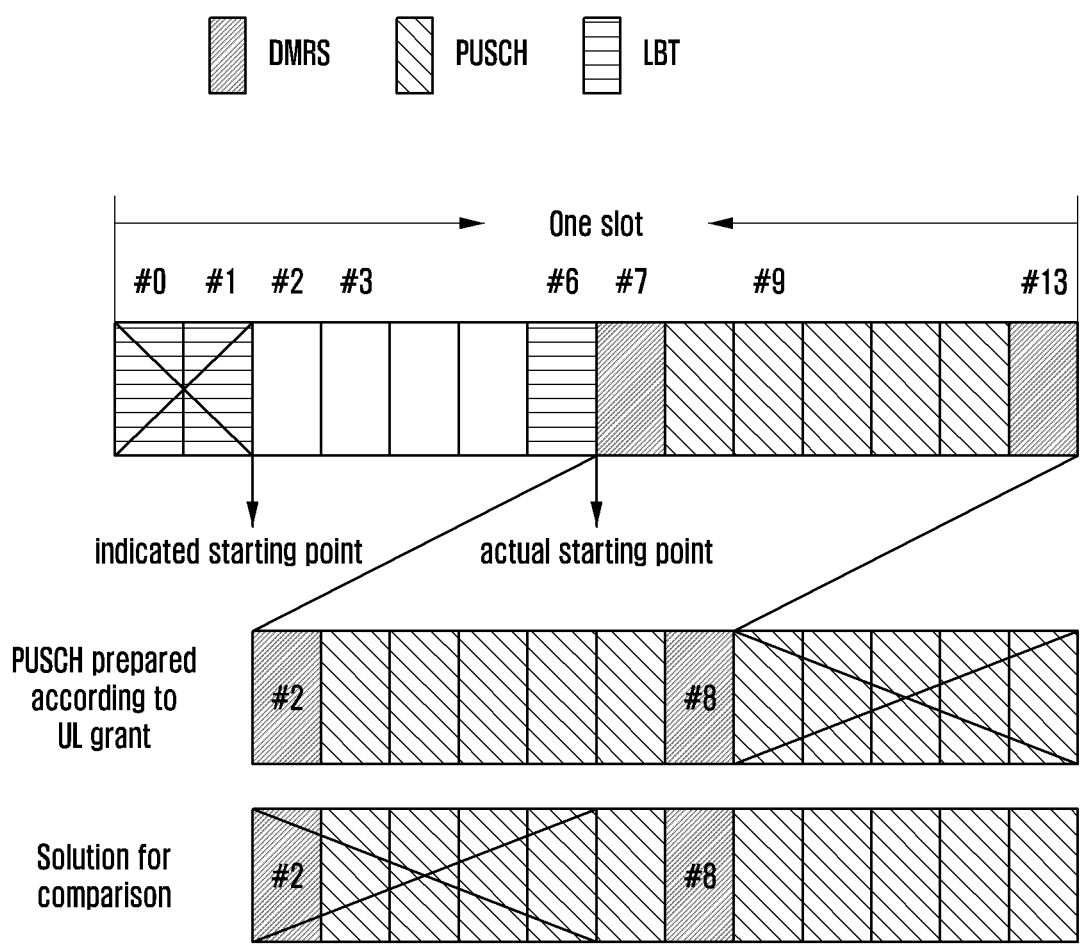
FIG. 11 shows an example of a symbol mapping in accordance with an embodiment of the present invention.

FIG. 11 shows an example of a symbol mapping in accordance with an embodiment of the present invention. As shown in FIG. 11, the base station schedules the UE to transmit a PUSCH, and indicates that the starting point of the PUSCH is at symbol #2 and the length is 12 symbols, and the DMRS is located at the first symbol of the PUSCH, that is, symbol #2, and symbol #8. The UE generates the PUSCH according to the UL grant. The base station configures an additional possible starting point, i.e., symbol #7. The UE does not successfully complete the LBT before symbol #2, but completes the LBT at symbol #7, so it transmits the PUSCH at symbol #7. According to the above described manner, the UE extracts the first 7 symbols from the prepared PUSCH, and maps to symbols #7 to #13 of this slot. For comparison, another mapping mode is shown in the figure. The UE extracts the last 7 symbols from the prepared PUSCH and maps to symbols #7~#13 of this slot.

Figure 12:
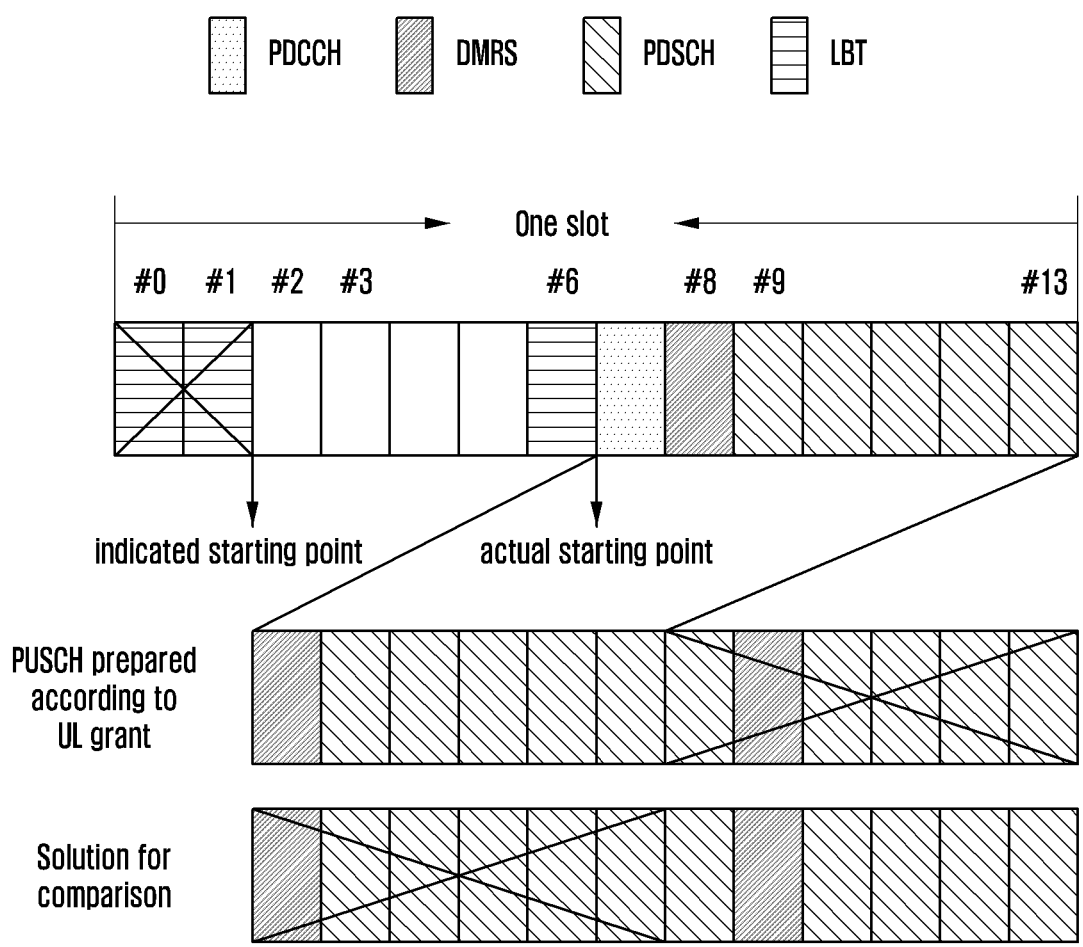
FIG. 12 shows an example of a symbol mapping in accordance with an embodiment of the present invention.

Preferably, the method described above is also applicable to downlink transmission. For example, the starting point of the PDSCH is not indicated in the DL DCI that schedules the PDSCH, or the indicated starting point is an offset from the PDCCH. FIG. 12 shows an example of a symbol mapping in accordance with an embodiment of the present invention. As shown in FIG. 12, the base station schedules the UE to receive the PDSCH, and indicates that the starting point of the PDSCH is the first symbol after the PDCCH ends, the length is 12 symbols, and the DMRS is located at the first symbol of the PDSCH, that is, symbol #2, and symbol #9. The base station generates a 12-symbol PDSCH based on the DL DCI. The base station configures an additional possible starting point, i.e., symbol #7. The base station does not successfully complete the LBT before symbol #2, and completes the LBT at symbol #7, so it transmits the PDCCH at symbol #7. According to the manner described above, the base station extracts the first 6 symbols from the prepared PDSCH, and maps to the first symbol after the PDCCH, that is, from symbol #9 to symbol #13. For comparison, another mapping method is shown in the figure. The base station extracts the last 6 symbols from the prepared PDSCH and maps to symbols #8~#13 of this slot.

Preferably, the base station configures, for the UE, a set $S_{adp}$ of other possible uplink transmission starting point or downlink transmission starting point in addition to the time starting point $P_{s0}$ configured by the base station by using the DL DCI or the UL grant or the higher layer configuration. The UE preferentially attempts to receive or transmit a signal according to the time starting point $P_{s0}$. If the signal cannot be received or transmitted at the time starting point $P_{s0}$ due to the failure of the LBT, it attempts to try to receive or transmit at a point in the set $S_{adp}$ later than $P_{s0}$.

Preferably, the starting point indicated in the set $S_{adp}$ may be an absolute position in a slot or an offset backward with respect to $P_{s0}$. For example, the indicated $P_{s0}$ is symbol #2, and the set $S_{adp}$ indicates the offsets with respect to symbol #2, which are 1, 3, and 5 symbols, that is, the set of starting points are symbols #3, #5, and #7.

Embodiment 2

In the 5G system, the concept of the bandwidth part (BWP) is introduced. The UE performs reception and transmission within one BWP, respectively. The downlink reception is performed within the DL BWP, and the uplink transmission is performed on the UL BWP. A BWP may be equal to the system bandwidth of the carrier or a part of the system bandwidth. The base station may configure multiple BWPs for the UE, but the UE can only transmit or receive on one BWP at a time. Such a BWP is called an active BWP (active BWP). The base station may dynamically indicate the active BWP by dynamic signaling, for example, scheduling DL or UL grant of downlink or uplink data, or the active BWP may fall back to a default BWP according to a predefined timer. As the UE capabilities increase, some UEs can receive or transmit on multiple BWPs simultaneously.

In the prior art, the bandwidth of the uplink LBT is equal to the bandwidth occupied by the uplink transmission, that is, the system bandwidth of the carrier, and the bandwidth of the downlink LBT is also equal to the system bandwidth of the carrier, for example, 20 MHz. That is, the LBT needs to be performed over the entire system bandwidth. In the new system, it supports that the BWP where the downlink transmission or the uplink transmission to be actually transmitted is located is only part of the system bandwidth. If the LBT based on system bandwidth is still used, it will lead to an overly conservative access mechanism. For example, in new systems, as base station and UE capabilities increase, downlink or uplink transmissions can support a larger bandwidth BW1, such as 80 MHz bandwidth. Each transmission may be transmitted over the entire BW1, or only on a part of the bandwidth BW1, for example, 20 MHz may be the minimum transmission bandwidth. Then, if the expected transmission bandwidth is only 20 MHz, but it still performs LBT at 80 MHz, the LBT performing on 80 MHz may fail due to interference at the other 60 MHz in 80 MHz, resulting in that the transmitting party is unable to transmit a signal even if there is no interference at the expected 20 MHz. In order to avoid the performance loss of the conservative access mechanism, the LBT performed by the base station or the UE before the transmission may be performed on a bandwidth smaller than the bandwidth BW1. For example, the BW1 may be divided into M1 subbands or BWPs, for example, M1=4, the bandwidth of each subband or BWP is 20 MHz. The transmitting party may perform LBT on the M1 subbands or BWPs respectively, and transmit signals on one or more subbands or BWPs on which the LBT is successfully performed. The BW1 is equal to the BWP on which the UE transmits or receives, or the subband or BWP is equal to the BWP on which the UE transmits or receives.

In an implementation, the transmitting party maps one PDSCH or PUSCH that is expected to be transmitted to the subband or BWP on which the LBT is successfully performed according to the LBT result of each subband or BWP. If the subband or BWP on which the LBT is successfully performed is not equal to BW1, it means that the PDSCH or PUSCH has a modulation and coding rate higher than the expected modulation and coding rate, which will bring a great burden to the transmitting party, and the transmitting party is required to perform rate matching, resource mapping for the PDSCH or the PUSCH according to the available frequency domain resources within a short time. In another implementation, the transmitting party prepares the PDSCH or the PUSCH according to the time-frequency resource expected to be scheduled. For example, it is expected to be scheduled to transmit on the BW1 80 MHz. The transmitting party maps bits of the prepared PDSCH or PUSCH corresponding to the subbands or BWPs on which the LBT detection is successfully performed to the subbands or BWPs on which the LBT detection is successfully performed for transmission. Since the PDSCH or the PUSCH is mapped in the frequency domain first and in the time domain later in the entire 80 MHz band, some bits in one CBG are dropped, that is, the bits corresponding to the subbands or BWPs on which the LBT detection fails are dropped, and the remaining bits are transmitted. Since these dropped bits result in a decoding error of the CBG including these dropped bits, a NACK is generated, which eventually results in a NACK for each CBG of one TB because each CBG includes a dropped bit. Therefore, the performance is significantly reduced.

In order to reduce the impact of the dropped bits and reduce the burden on the transmitting party, the transmitting party may perform the mapping in the frequency domain first and in the time domain later in each subband or BWP on which the LBT is performed when preparing the PDSCH or the PUSCH. The transmitting party maps bits of the prepared PDSCH or PUSCH corresponding to the subbands or BWPs on which the LBT detection is successfully performed to the subbands or BWPs on which the LBT detection is successfully performed for transmission. This can effectively limit the bits on the untransmitted subband or BWP within some CBGs, and reduce the impact on other successfully transmitted bits.

Preferably, when bits are mapped in each subband, bits of one CB cannot span two subbands, that is, only within one subband. Preferably, when the CBG is constructed, one CBG cannot span two subbands, that is, only within one subband.

Figure 13:
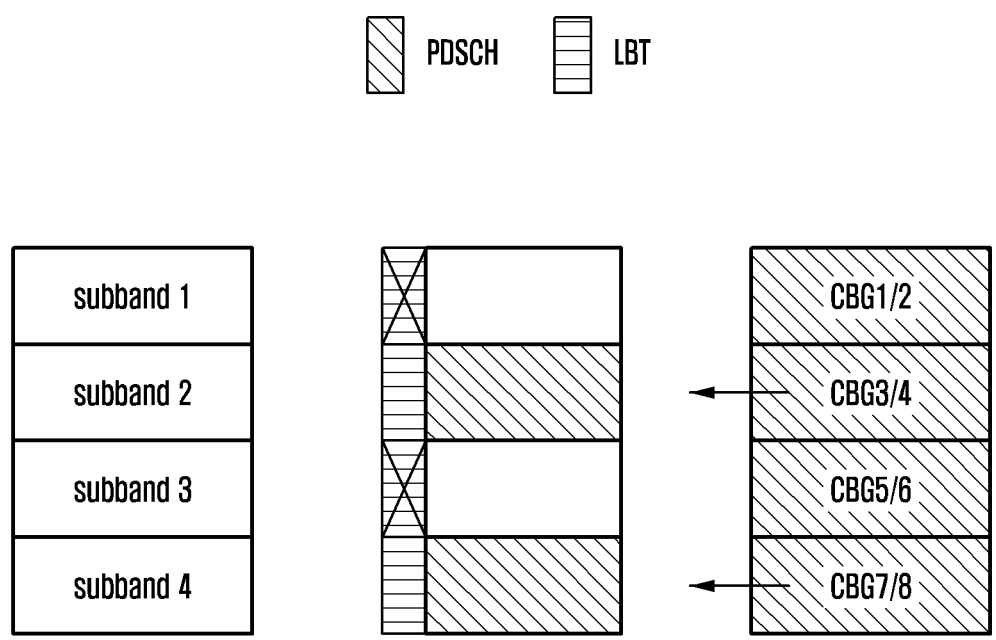
FIG. 13 shows an example of a symbol mapping in accordance with an embodiment of the present invention.

FIG. 13 shows an example of a symbol mapping in accordance with an embodiment of the present invention. As shown in FIG. 13, the base station schedules the UE to receive the PDSCH on 80 MHz bandwidth. The base station performs the mapping of the PDSCH in each subband in the frequency domain first and in the time domain later. That is, firstly in subband 1, the PDSCH is mapped from the first subcarrier of one symbol to the last subcarrier of the symbol, and then to the second symbol, and so on. Then in subband 2, PDSCH is mapped from the first subcarrier of one symbol to the last subcarrier of this symbol, and then to the second symbol, and so on, until it is mapped in subband 4. The base station then maps bits of subband 2 and subband 4 of the prepared PDSCH to subband 2 and subband 4 based on the result of the LBT. Assuming that a TB can be divided into 8 CBGs, there are 2 CBGs in each subband. Whether a subband is transmitted has no effect on the decoding result of the CBG of that subband.

Preferably, the uplink transmit power is calculated according to the number of scheduled PRBs.

Preferably, the uplink transmit power is calculated according to the number of actually transmitted PRBs.

Preferably, in the power head reporting (PHR), the power of the PUSCH is calculated according to the number of scheduled PRBs.

Preferably, when the UE needs to transmit the PUCCH, the UE may perform LBT on multiple subbands, and then transmit the PUCCH on a subband on which the LBT is successfully performed. When the UE successfully completes the LBT on multiple subbands, the UE may select one subband to transmit the PUCCH, or select one subband to transmit the PUCCH according to a predefined rule.

Preferably, the predefined rule is at least one of the following:
(1) The UE transmits the PUCCH on the subband with the smallest index value in the subbands on which the LBT is successfully performed.
(2) The base station pre-configures the subband sequence for transmitting the PUCCH; the UE determines to transmit the PUCCH on the subband with the highest priority according to the configured subband sequence in the subbands on which the LBT is successfully performed.
(3) The UE selects the subband that has earliest PUCCH resources in the subbands on which the LBT is successfully performed to transmit the PUCCH.
(4) The UE selects the subband with the highest transmission efficiency of the PUCCH resource in the subbands on which the LBT is successfully performed to transmit the PUCCH. Preferably, the coding rate when the UCI is transmitted on the physical resource of the PUCCH does not exceed the configured or predetermined UCI maximum coding rate, and the less the physical resources occupied by the PUCCH is, the transmission efficiency of the PUCCH resource is the highest.

Preferably, the base station may separately configure PUCCH resources for the UE on one or more subbands. The UE selects a subband in the subbands on which the LBT is successfully performed according to the above manner, and transmits the PUCCH on the PUCCH resource on the subband. Preferably, the base station may configure the PUCCH resource on the BWP for the UE. If the bandwidth of the subband on which the LBT is successfully performed is less than the BWP bandwidth, the UE transmits the PUCCH on the physical resource that belongs to the configured PUCCH resource on the subband.

Preferably, the transmitting party may indicate on which subbands or BWPs the transmitted signal is transmitted.

Preferably, the actually transmitted subband or BWP may be indicated explicitly in the DCI. For example, a specific bit field is included in the DCI indicating the actually transmitted subband or BWP. Taking the bit field length of 2 bits as an example, four combinations of actually transmitted subbands or BWPs can be indicated. The combination is configured by higher layer signaling.

Preferably, the actually transmitted subband or BWP can be indicated by a predefined signal. For example, a predefined pilot sequence is transmitted on the actually transmitted subband or BWP, and the receiving party may determine whether there is a signal transmission on the subband or BWP by detecting the pilot sequence.

Preferably, when the PUCCH and the PUSCH overlap in the time domain, if the LBT corresponding to the PUSCH transmission succeeds, the UCI in the PUCCH is carried on the PUSCH, and the PUCCH transmission is discarded; if the LBT corresponding to the PUSCH transmission is unsuccessful, and the LBT corresponding to the PUCCH transmission is successful, only the PUCCH is transmitted.

For example, the activated BWP bandwidth is 40 MHz, which can be divided into two non-overlapping LBT subbands, each subband being 20 MHz. If the base station schedules UE to transmit a PUSCH on the 40 MHz bandwidth, the PUSCH can be transmitted if and only if the UE successfully completes the LBT on the 2 LBT subbands. Differently, the PUCCH resource is within one subband, and the UE only needs to successfully complete the LBT on one subband before transmitting the PUCCH. If the UE successfully completes the LBT only on one LBT subband, the UE does not transmit the PUSCH and only transmits the PUCCH. If the UE successfully completes the LBT on the two LBT subbands, the UE transmits the PUSCH and transmits the UCI in the PUCCH on the PUSCH, while does not transmit the PUCCH.

Embodiment 3

The PUCCH may allocate resources by taking a predefined Resource Block Group (RBG) as a minimum unit. For example, the resource block group is a set of RBs that are divided at a predefined interval within a BWP, or within a predefined bandwidth. For example, if the BWP or the predetermined bandwidth is 40 MHz and includes 200 RBs, 10 RBGs may be formed at intervals of 10 RBs. Each RBG includes 20 RBs that are separated by 10 RBs. For example, the first RBG includes 1, 11, 21, . . . or 191 RBs.

When the base station configures the PUCCH resource for the UE, it takes the RBG as the minimum unit, and may configure one or more RBGs for the UE.

The UE may determine the actually required PUCCH resource according to the number of bits of the uplink control information UCI and the predefined maximum coding rate. The actually required PUCCH resource also takes an RBG as the minimum unit and does not exceed the configured number of RBGs. If the number of RBGs required for the actually required PUCCH resource is less than the configured number of RBGs, the RBGs are selected from the RBGs with the lower indexes in the configured RBGs.

For example, the base station configures four PUCCH resources for the UE, which are the first RBG, the fifth RBG, the fourth and fifth RBGs, and the eighth and ninth RBGs. The base station indicates one of the PUCCH resources, the 4th and 5th RBGs to the UE. Each RBG includes 10 RBs. The UE calculates the actually required PUCCH resource as 8 RBs according to the number of bits of the UCI and the predefined maximum coding rate. Since 8 is smaller than the total number of RBs (10 RBs) of 1 RBG, the UE should select one of the 4th and 5th RBGs indicated, that has the smaller index, that is, the 4th RBG.

Another implementation in which the PUCCH may allocate resources by taking a predefined Resource Block Group (RBG) as a minimum unit is that a resource block group comprises X PRBs, and the number of occupied resource block groups is ≥N. For example, if X=1, the number of PRBs that may be occupied by one PUCCH is ≥N, where the value of N may be determined according to a predefined rule. For example, in some frequency bands of the unlicensed frequency band, the resource occupied by the transmitted signals in the frequency domain needs to meet the requirement of occupying the channel bandwidth. The resource occupied by the transmitted signal in the frequency domain is not less than 2 MHz, and this is temporary. Taking the subcarrier spacing being 15 KHz as an example, at least N=12 PRBs need to be transmitted. When the base station configures the PUCCH resource for the UE, for the UE, each PUCCH resource occupies consecutive M PRBs in the frequency domain, and M≥N.

The UE may determine the actually required PUCCH resource according to the number of bits of the uplink control information UCI, the predefined maximum coding rate, and N. If the number L of PRBs occupied by the PUCCH resource determined according to the number of bits of the uplink control information UCI and the predefined maximum coding rate is less than N, L may be divided into Z groups and dispersed within the channel bandwidth. For example, Z=2, that is, L PRBs are divided into two groups, the two group including floor(L/2) and ceil(L/2) PRBs respectively, where floor means rounded down and ceil means rounded up. The two groups of PRBs are respectively placed at both ends of the PRBs occupied by the PUCCH resources indicated by the base station. For example, the base station configures four PUCCH resources for the UE, which are 1st to 13th PRBs, 20th to 35th PRBs, 40th to 55th PRBs, and 60th to 71st PRBs. The base station indicates one of the PUCCH resources, i.e., 20th to 35th PRBs for the UE. The UE calculates the actual required PUCCH resource as 10 PRBs according to the number of bits of the UCI and the predefined maximum coding rate. Then, the resources occupied by the PUCCH actually transmitted by the UE are the 20th to 24th PRBs, and the 31st to 35th PRBs. Alternatively, the first group of PRBs is placed with the first PRB occupied by the PUCCH resources indicated by the base station as a starting point, and the interval between the last PRB of the second group of PRBs and the starting point of the first group of PRBs is not less than N PRBs. For example, the resources occupied by the PUCCH actually transmitted by the UE are the 20th to 24th PRBs, and the 28th to 31st PRBs. Alternatively, if the PUCCH resource configured by the base station is granulated by an interlace, the L PRBs are divided into two groups, one group corresponding to the first (L/2) PRBs of the interlace, and the other one group corresponding to the last (L/2) PRBs of the interlace. For example, an interlace contains 20 PRBs. When L=8, the actual PUCCH resource occupies the 1st to 4th PRBs and the 17th to 20th PRBs of the 20 PRBs. For another example, when L=26, it occupies one complete interlace and the 1st to 3rd PRBs and the 18th to 20th PRBs of the second interlace.

In the above example, for simplicity and clarity of description of the present invention, a simplified description of how to determine several PUCCH resources according to the indication of the base station is provided. In an actual system, the UE generally needs to determine a PUCCH resource group according to the number of bits of the UCI, and determine a PUCCH resource in the PUCCH resource group according to a PUCCH resource index (PRI) indicated by the base station. Based on this, the present invention further determines a PRB/RBG actually occupied by a UE in the PUCCH resource.

Embodiment 4

The base station may configure repetition transmission of the PDSCH or PUSCH of the UE, and configure a redundancy version (RV) sequence when configuring repetition transmission. For example, the base station configures the PUSCH with a repetition factor of 4 for the UE, and configures the RV sequence to be $RV_1$, $RV_2$, $RV_3$, and $RV_4$, which in turn correspond to $PUSCH_1$, $PUSCH_2$, $PUSCH_3$, and $PUSCH_4$, and all four PUSCHs include the same TB. Among them, $RV_i$ has a value in the range of 0, 1, 2, 3.

The base station schedules the UE to perform PUSCH transmission on the indicated uplink slot by using the UL grant, and the UE performs the LBT before the start of the uplink slot. For example, the base station instructs the UE to transmit a PUSCH having a repetition factor of 4 on the uplink slots n, n+1, n+2, and n+3. The UE performs LBT before the PUSCH resource of the uplink slot n starts. If the LBT succeeds, the $PUSCH_1$, $PUSCH_2$, $PUSCH_3$, and $PUSCH_4$ may be continuously transmitted in the four slots from the slot n. if the UE does not successfully complete the LBT before the PUSCH resource of the uplink slot n starts, the UE may continue to perform the LBT until the LBT is completed before the PUSCH resource of the slot n+j starts, and the PUSCH may be continuously transmitted from the slot n+j to the slot n+3, where j≤3. In one implementation, the UE continuously transmits $PUSCH_1 \ldots PUSCH_{4-j}$ from slot n+j to slot n+3, and the RV corresponding to each PUSCH is $RV_1 \ldots RV_{4-j}$, respectively. For example, the $RV_1, RV_2, RV_3,$ and $RV_4$ configured by the base station are 0, 2, 3, and 1, respectively. Suppose j=2. Then, the UE transmits $PUSCH_1$ and $PUSCH_2$ on the slot n+2 and the slot n+3, respectively, and RV is 0 and 2, respectively. Preferably, the UE may further transmit a UCI when transmitting the PUSCH, where the UCI includes RV information. For example, the $PUSCH_1$ transmitted by the UE on the slot n+2 includes RV information RV=0, and the $PUSCH_2$ transmitted by the UE on the slot n+3 includes RV information RV=2. It has the advantage that the RV blind detection of the PUSCH by the base station can be reduced, and the base station can determine the RV of each PUSCH according to the RV information in the UCI. In another implementation, the UE continuously transmits $PUSCH_j \ldots PUSCH_4$ from the slot n+j to the slot n+3, and the RV corresponding to each PUSCH is $RV_j \ldots RV_4$, respectively.

In order to enable the transmitted PUSCH to include at least one self-decodable RV, for example, RV=0 of at least one PUSCH, the base station shall configure a self-decodable RV for the last PUSCH, for example, $PUSCH_4$ when configuring the RV sequence. For example, the RV sequence configured by the base station is {1, 3, 2, 0}, or {3, 0, 3, 0}, or is {0, 0, 0, 0}. When the number of configured PUSCH repetition transmissions is greater than the RV sequence length, for example, the number of PUSCH repetition transmissions is 6, and the RV sequence length is 4, the RVs of $PUSCH_1$ to $PUSCH_6$ are $\{RV_3, RV_4, RV_1, RV_2, RV_3, RV_4\}$, respectively.

The repetition transmission of the PUSCH may also be in units of slots, that is, each PUSCH is in a different slot. In some scenarios, the continuously transmitted N PUSCHs are beneficial for the UE to continuously occupy the channel, and the base station may indicate, by using the UL grant, the slot and the starting point where the first PUSCH of the N PUSCHs is located (the starting point may be a symbol boundary, such as a symbol 0 or a symbol 1, or within one symbol, for example, 25 us later than the starting boundary of the symbol 0), the UE occupies N slots consecutively from the starting point, with no interval in-between, and the UL grant indicates the symbol where the last PUSCH of the N PUSCHs ends. The value of N may be configured by the base station through higher layer signaling, or the base station indicates it by using the UL grant. The mapping method of the above PUSCH is called Mode One. In other scenarios, in order to ensure that other UEs also have an opportunity to access the channel during a UE transmits the N PUSCHs, the base station may indicate the starting and ending positions of the N PUSCHs in each slot by using the UL grant. Therefore, it is possible to support the N PUSCHs with intervals in-between in the time dimension. The mapping method of the above PUSCH is called Mode Two. In this case, the UE performs the first type LBT or the second type LBT before the first PUSCH, and may perform a faster LBT before the second to N PUSCHs, for example, the second type LBT (25 us). The base station may uniformly indicate the start and end of each PUSCH to support the same starting and ending positions in the UL grant, or respectively indicate the start and end of each PUSCH to support possibly different starting and ending positions. Preferably, the base station may configure multiple sets of starting and ending point combinations of individual PUSCHs by using higher layer signaling, and the base station indicates one set in the UL grant. Preferably, the base station can explicitly indicate in the physical layer signaling (for example, the UL grant or the common PDCCH) whether the UE transmits the PUSCH in Mode One or Mode Two, for example, by using an extra bit indication or by using a specific combination of some bits in the UL grant. Preferably, the base station may configure a specific set of slots, and the UE performs PUSCH transmission in Mode 2 in the set of slots and performs PUSCH transmission in mode 1 in other slots. For example, in order to reduce the impact of the PUSCH on the PRACH transmission, the base station may configure some slots in which the UE must perform PUSCH transmission in Mode Two, so that the PRACH in the same slot has a chance to successfully complete the LBT. The base station may configure the starting point of the PUSCH of the UE to be aligned with the starting point for transmitting the PRACH. For example, the starting point of the PUSCH is the starting boundary of the symbol determined by the uplink transmission timing+TA (timing advance). Alternatively, the base station may configure the starting point of the PUSCH of the UE later than the starting point for transmitting PRACH.

The repetition transmission of the PUSCH may also be in units of symbols, that is, each PUSCH may occupy N symbols, and the N symbols occupied by each PUSCH are adjacent. For example, if the number of repetitions of the PUSCH is 4 and the time resource of each PUSCH is 2 symbols, the UE can transmit the 4 PUSCHs on consecutive 8 symbols. The base station may configure the value of N by the higher layer signaling, or indicate the value of N by using the UL grant, and may indicate the starting point of the first PUSCH of the continuously transmitted N PUSCHs by using the UL grant, for example, it starts at or within which symbol of which slot. Preferably, the continuously transmitted PUSCH cannot go beyond the boundary of the slot.

Preferably, similarly to the repetition transmission of the PUSCH in units of slots, for the PUSCH that is repeated in units of symbols, there are two ways to map the PUSCH. The base station can explicitly indicate whether the UE is in Mode One or Mode Two in the physical layer signaling. The PUSCH is transmitted, or configures a specific set of slots, and the UE performs PUSCH transmission in Mode 2 in the set of slots and performs PUSCH transmission in mode 1 in other slots. For example, the base station indicates in the UL grant that the UE uses Mode Two to transmit the PUSCH, indicates the number of symbols occupied by each PUSCH in the UL grant, for example, two symbols, and indicates that the starting point of the first PUSCH is at the starting boundary of the symbol 0 of the slot n+TA. So, $PUSCH_2$ occupies symbols 2 and 3, the starting point is at the starting boundary of symbol 2+TA; $PUSCH_3$ occupies symbols 4 and 5, the starting point is at the starting boundary of symbol 4+TA; and $PUSCH_4$ occupies symbols 6 and 7, and the starting point is at the starting boundary of symbol 6+TA.

Preferably, the method for transmitting the PUSCH described above is also applicable to the case of scheduling multiple PUSCHs by one UL grant (referred to as multiple-PUSCH scheduling). For example, one UL grant schedules four PUSCHs, and each PUSCH corresponds to a different transmission block (TB). The method for transmitting the PUSCH in Mode One or Mode Two is also applicable to each PUSCH. Mode One is that the four PUSCHs are continuously transmitted with no Interval in-between, and Mode Two is that the four PUSCHs have the same starting and ending points in each slot.

If it is required to dynamically indicate the switching between the slot-based multiple PUSCH scheduling and symbol-based multiple PUSCH scheduling (also referred to as sub-slot-based scheduling), or a combination of the two modes, the base station may indicate one or a combination of the two modes in any entry in the configured time resource allocation information table, and dynamically indicates the entry in the configured time resource allocation information table in the UL grant. For example, an indication of the slot-based scheduling or the sub-slot-based scheduling is added in the time resource allocation information PUSCH-TimeDomainResourceAllocation defined in the 3GPP NR protocol TS 38.331, so that the UE can determine the indicated start symbol, and whether the length information (startSymbolAndLength) is applicable to the first slot and the last slot or applicable to the first PUSCH. For another example, startSymbolAndLength includes 2 fields, one of which represents the time resource of the first PUSCH scheduled based on the sub-slot, and the other represents the time resource of the last PUSCH based on the slot scheduling, that is, the end symbol of this PUSCH. Then, the UE may transmit continuously in the first slot X PUSCHs based on the sub-slots scheduling from the starting point of the first PUSCH based on the sub-slot scheduling, each PUSCH having the same length as the first PUSCH, and transmit one PUSCH that occupies the entire slot in each subsequent slot, and transit in the last slot the last PUSCH from the first symbol. The end symbol of the last PUSCH is based on the time resource of the last PUSCH based on the slot scheduling as indicated in startSymbolAndLength. In the above implementation, the number of continuously transmitted PUSCHs or the number of slots is configured by a single bit field. In another implementation, the number of continuously transmitted PUSCHs or the number of slots, the scheduling mode of each PUSCH, and the symbol starting boundary and length of individual PUSCHs are jointly encoded.

Embodiment 5

The scheduling of multiple PUSCHs, that is, scheduling multiple PUSCHs by one UL grant, can save signaling overhead of uplink scheduling. Multiple PUSCHs scheduled by one UL grant carry different transport blocks (TBs). To support flexible scheduling, the transmission status of each TB can be different, for example, some TBs are for initial transmissions and some TBs are for retransmissions. Therefore, there is a bit field indicating retransmission or new transmission respectively for each TB in a UL grant. For example, one UL grant schedules 4 PUSCHs, and each PUSCH has 1 bit NDI. If the base station configures a CBG-based transmission, the CBG transmitted by each TB may be different. For example, for the initially transmitted TB, all CBGs of the TB need to be transmitted. For the retransmitted TB, some or all of the CBGs of the TB need to be transmitted. For different retransmitted TBs, the CBGs that need to be retransmitted may also be different. In a UL grant, indicating the CBG information of each TB scheduled separately may result in a maximum flexibility, but the DCI overhead is too large. In order to reduce the DCI overhead, in a UL grant, a general indication is used for the CBG information of all scheduled TBs, and the CBG information indication is common to each retransmitted TB, and the newly transmitted TB does not depend on the CBG information indication. All CBGs of the newly transmitted TB are transmitted. For example, the configured maximum number of CBGs $N_{HARQ\text{-}ACK}^{CBG/TB,max}=4$, and 4 bits in the UL grant indicate whether to transmit the 4 CBGs. For the PUSCH for which the NDI in the UL grant indicates a new transmission, the CBG to be transmitted is not determined according to the CBG information indication, and all CBGs are to be transmitted. For the PUSCH for which the NDI in the UL grant indicates a retransmission, the CBG to be transmitted is determined according to the CBG information indication. The CBGs transmitted by these retransmitted PUSCHs are the same.

It is not difficult to see that the general CBG indication limits the flexibility of scheduling. In order to achieve a compromise between flexibility and DCI overhead, a CBG indication bit field is defined in the UL grant for indicating CBG information for each PUSCH, and it supports that the CBGs transmitted by each PUSCH are the same or different.

Preferably, the bit number M1 of the CBG indication bit field is configured by the base station or predefined.

One implementation is that the CBG indication bit field is only used for the retransmitted PUSCH. The number of bits of the CBG indication corresponding to each retransmitted PUSCH is Xb=floor(M1/Np), or Xb=ceil(M1/Np), where M1 is the sum of the number of bits of the CBG indication corresponding to all retransmitted PUSCHs, Np is the number of retransmitted PUSCHs scheduled by one UL grant. The bit positions of the CBG indications corresponding to respective retransmitted PUSCHs are determined according to the HARQ process ID of the PUSCHs or the time resource order of the PUSCHs.

Preferably, the Xb bit indicates whether $N_{HARQ\text{-}ACK}^{CBG/TB,max}$ number of CBGs are CBG/TB,max transmitted in a bit-map manner. For example, Xb=4 bits, $N_{HARQ\text{-}ACK}^{CBG/TB,max}=4$ CBGs. The 4 bits are respectively associated with 4 CBGs, '1' means transmission, and '0' means no transmission. If Xb<$N_{HARQ\text{-}ACK}^{CBG/TB,max}$, each bit indicates the transmission of Xc CBGs, where Xc=floor ($N_{HARQ\text{-}ACK}^{CBG/TB,max}$)/Xb or ceil($N_{HARQ\text{-}ACK}^{CBG/TB,max}$)/Xb). Alternatively, if the number of bits Xb of the CBG indication corresponding to each PUSCH is smaller than the number C of the code blocks of the PUSCH, each bit indicates the transmission of Xc CBGs, where Xc=floor (C/Xb) or ceil (C/Xb). If Xb>$N_{HARQ\text{-}ACK}^{CBG/TB,max}$, the first $N_{HARQ\text{-}ACK}^{CBG/TB,max}$ bits of the Xb bits are used to indicate the transmission of $N_{HARQ\text{-}ACK}^{CBG/TB,max}$ CBGs. Alternatively, M1 is an integer multiple of Np. Alternatively, $N_{HARQ\text{-}ACK}^{CBG/TB,max}$ is an integer multiple of Xb.

For example, assuming that the maximum number of CBGs configured by the base station is $N_{HARQ\text{-}ACK}^{CBG/TB,max}=4$, the number of bits used to indicate CBG in the UL grant that schedules multiple PUSCHs is M1=8. In one scheduling, one UL grant schedules PUSCHs 1~4 to occupy slots #2~#5, where PUSCH 1 and PUSCH3 are newly transmitted PUSCHs, and PUSCH2 and PUSCH$_4$ are retransmitted PUSCHs. Then, for PUSCH$_2$ and PUSCH$_4$, it needs to determine the CBG to be transmitted according to the CBG bit indication, that is, Np=2, and each PUSCH corresponds to a M1/Np=4 bit CBG indication. Then, according to the time resource order of the PUSCH, PUSCH2 corresponds to the first 4 bits of the 8-bit CBG indication field, and PUSCH4 corresponds to the last 4 bits of the 8-bit CBG indication field. In the next scheduling, one UL grant schedules PUSCHs 5~8 to occupy slots #10~#13, respectively, where all PUSCHs are retransmitted PUSCHs. Then, each PUSCH corresponds to an M1/Np=2 bit CBG indication. Since $N_{HARQ\text{-}ACK}^{CBG/TB,max}=4$, the CBG indication is 2 bits, then each bit indicates the transmission of 2 CBGs. That is, the first 2 CBGs correspond to the first bit indication, and the last 2 CBG corresponds to the second bit indication. In a specific implementation, the base station can dynamically switch between scheduling of multiple PUSCHs and scheduling of a single PUSCH, so as to achieve a compromise between scheduling flexibility and signaling overhead.

Preferably, the Xb bit indicates whether to transmit $N_{HARQ-ACK}^{CBG/TB,max}$ CBGs according to a predefined rule. The Xb bit may indicate 2× number of status of CBG transmissions. For example, Xb=2 bits, $N_{HARQ-ACK}^{CBG/TB,max}=4$. The value "00" of Xb indicates that all four CBGs are transmitted, "01" indicates that the first CBG is transmitted, "10" indicates that the first and second CBGs are transmitted, and "11" indicates that the first to third CBGs are transmitted. The predefined rules are predefined by the standard, or configured by the base station.

Another implementation is that M1 indicates the transmission of CBGs of multiple PUSCHs. The M1 bit can indicate $2^{M1}$ number of status of CBG transmissions. The $2^{M1}$ number of status of CBG transmissions are predefined by the standard. Optionally, the $2^{M1}$ number of status of CBG transmissions correspond to the retransmitted PUSCHs. Optionally, the $2^{M1}$ number of status of CBG transmissions corresponds to the scheduled PUSCH. In addition, in the scheduling of multiple PUSCHs, the base station may schedule multiple PUSCHs in the first slot, and each PUSCH occupies a partial slot (also referred to as sub-slot scheduling). For example, each PUSCH occupies 2 symbols. The base station may schedule one PUSCH for each subsequent slot, and the PUSCH occupies an entire slot. The PUSCH scheduled in the last slot occupies multiple symbols starting from the first symbol of the slot. Considering that the CBG-based transmission benefits the PUSCH based on the sub-slot scheduling less, the TB-based scheduling is used for the PUSCH based on the sub-slot scheduling in the first slot, and the CBG-based scheduling is used for the other slots. Then, for the PUSCH for which the NDI in the UL grant indicates a new transmission, and for the PUSCH based on the sub-slot scheduling in the first slot for which the transmitted CBGs are not determined according to the CBG indication, all the CBGs are to be transmitted, while for other PUSCHs, the CBGs to be transmitted are determined according to the CBG indication, and the CBGs transmitted by these PUSCHs are the same.

Preferably, the base station can configure which CBG indication method is used.

In the scheduling of multiple PUSCHs, in order to save signaling overhead, only one MCS may be indicated in the UL grant, which is common to the plurality of PUSCHs that are scheduled. The number of resources (RE) actually occupied by these PUSCHs may be different. The TBS of each PUSCH are determined according to the information on scheduled time-frequency resource of each PUSCH. The scheduled time-frequency resource of the PUSCH is jointly determined by the PUSCH time-frequency resource information indicated in the UL grant and other uplink signals. The other uplink signals include SRS. For example, if the time resource of a certain PUSCH is the 3rd to 13th symbols in a slot, and the 13th symbol in the slot is used to transmit the SRS, the TBS is calculated according to 10 symbols, that is, the part of PUSCH resource occupied by the SRS symbol is subtracted. Preferably, the other uplink signals include uplink control information, such as aperiodic CSI.

Embodiment 6

If there are more than one available transmission method for the uplink transmission signal, for example, it may be based on a discontinuous resource allocation manner in the frequency domain, such as based on interlace, or based on a resource allocation manner that continuously occupies one or more PRBs in the frequency domain, the transmission method may be determined according to at least one of the followings.

(1) For as operating frequency point, or frequency band, the transmission method is unique, and the one transmission method is pre-defined by the standard.

(2) It indicates which transmission method to use by system information such as RMSI. In the RMSI, the signaling of the initial uplink BWP may be configured, or an additional separate signaling may be used to indicate which transmission method to use.

(3) It indicates which transmission method use by the DCI.

Preferably, for the DCI in the PDCCH user-specific search space, for example, DCI 0_1, the base station configures that it only supports one PRB resource allocation mode, or it supports dynamic switching of multiple PRB resource allocation modes. If the base station configures to support dynamic switching of multiple PRB resource allocation modes, the bit field length for frequency domain resource allocation in the DCI is determined according to the maximum value of bits required for multiple PRB resource allocation modes.

Preferably, before establishing an RRC connection, the base station indicates the transmission method according to at least one of the foregoing methods.

Preferably, before establishing an RRC connection, the base station indicates a transmission method for the random access channel PRACH according to at least one of the foregoing methods, and determines the transmission methods for other uplink sending signals, such as PUSCH and/or PUCCH, according to the indicated PRACH transmission method.

Preferably, before establishing an RRC connection, based on the methods described above, the base station may use the same method or a different method to indicate the transmission methods for PRACH, PUSCH, and PUCCH.

Preferably, for a PUSCH transmission that uses a fallback DCI, such as DCI 0_0 scheduling, the base station indicates a transmission method according to at least one of the foregoing methods. For a PUSCH transmission using a normal DCI, such as DCI 0_1 scheduling, or a configured PUSCH transmission, the base station may indicate one of the plurality of transmission methods by higher layer signaling.

Preferably, after establishing an RRC connection, the base station may configure one of the plurality of transmission methods by higher layer signaling.

Preferably, if the interlace-based resource allocation mode is used, the interlace information indicated by the bit field of the frequency domain resource allocation includes at least one of: the partial interlace located in a certain one or more consecutive LBT subbands, the partial interlace determined with a predefined PRB interval, one or more complete interlaces. Among them, a complete interlace is an interlace that fills the entire activated BWP with the predefined PRB interval M. For example, the BWP bandwidth is 40 MHz, the PRB interval is M=10 PRBs, and a complete interlace includes N=20 PRBs with an interval of 10 PRBs. The partial interlace determined with the predefined PRB interval is N1 PRBs among N PRBs in one interlace, wherein N1 PRBs are equally spaced in the frequency domain, and the frequency domain interval of the N1 PRBs is an integer multiple of M.

Figure 14:
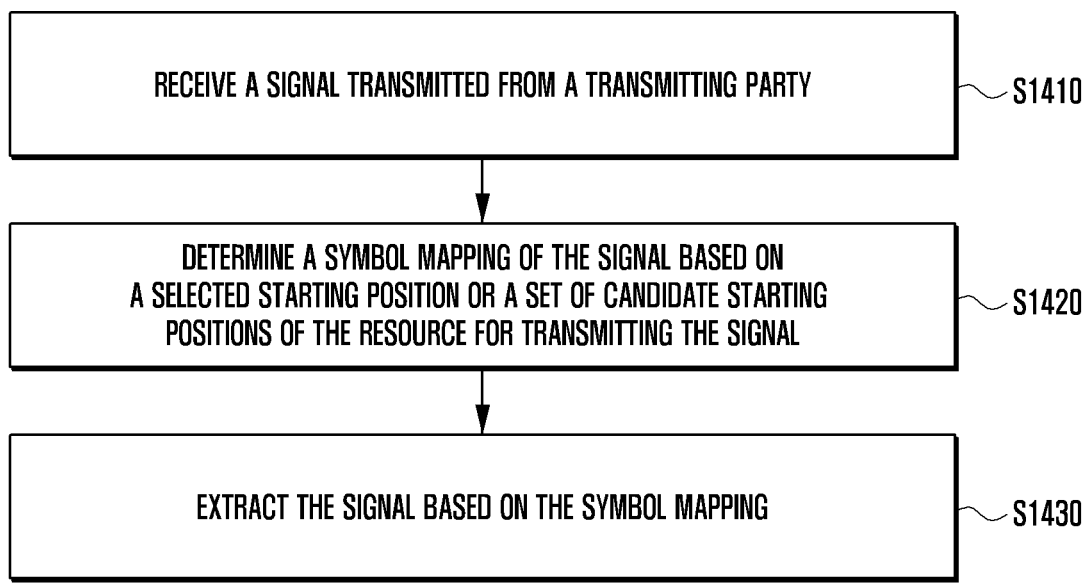
FIG. 14 shows an exemplary flow diagram of a method for receiving a signal in accordance with an embodiment of the present invention.

The technical solution of the embodiment of the present invention is illustrated from the point of view of the transmitting party. It should be understood that the solution can also be implemented correspondingly at the receiving party. FIG. 14 shows an exemplary flow diagram of a method for receiving a signal in accordance with an embodiment of the present invention. As shown in FIG. 14, the method comprises an operation S1410 of receiving a signal transmitted from a transmitting party.

The method comprises an operation S1420 of determining a symbol mapping of the signal based on a selected starting position or a set of candidate starting positions of the signal.

In some embodiments, the signal may be a Physical Uplink Shared Control Channel (PUSCH) or a Physical Downlink Shared Control Channel (PDSCH), which may be a Demodulation Reference Signal (DMRS). In this case, determining the symbol mapping of the signal based on a selected starting position or a set of candidate starting positions of the signal may include: determining a symbol mapping of the signal based on a selected starting position or a set of candidate starting positions of the signal comprises: determining that a starting position of the DMRS is located at a starting boundary of an OFDM symbol if a candidate starting position that is the last in the set of candidate starting positions is located at the starting boundary of the OFDM symbol; and determining that a starting position of the DMRS is located at a starting boundary of a first OFDM symbol after the OFDM symbol if a candidate starting position that is the last in the set of candidate starting positions is not located at the starting boundary of the OFDM symbol.

In some examples, the DMRS may comprise a plurality of groups of DMRSs, and a starting position of the DMRS is a starting position of a first group of DMRSs that is the earliest in the plurality of groups of DMRSs. In this case, the method shown in FIG. 14 may further comprise: determining positions of other groups of DMRSs in the plurality of groups of DMRSs with reference to the starting position of the first set of DMRSs based on an offset between positions of the plurality of groups of DMRSs.

In some embodiments, the signal may be a PUSCH or a PDSCH, which may be a Demodulation Reference Signal (DMRS), and determining a symbol mapping of the signal based on a selected starting position or a set of candidate starting positions of the signal may comprise: positioning the DMRS within a first complete OFDM symbol after the selected starting position of the PUSCH, and wherein the starting position of the DMRS is located after an OFDM symbol in which a Listen Before Talk (LTB) detection succeeds.

In some embodiments, the signal may be a PUSCH or a PDSCH, which may be uplink control information (UCI) or downlink control information (DCI), and determining a symbol mapping of the signal based on a selected starting position or a set of candidate starting positions of the signal may comprise: determining that a starting position of the control information is not earlier than a starting boundary of an OFDM symbol if a candidate starting position that is the last in the set of candidate starting positions is located at the starting boundary of the OFDM symbol; and determining that the starting position of the control information is not earlier than a starting boundary of a first OFDM symbol after the OFDM symbol if the candidate starting position that is the last in the set of candidate starting positions is not located at the starting boundary of the OFDM symbol.

In some examples, if the OFDM symbol including the starting position of the control information is occupied by a Demodulation Reference Signal (DMRS), the starting position of the control information may be determined to be at a starting boundary of a first OFDM symbol that does not include the DMRS after the OFDM symbol that is occupied by the DMRS.

In some examples, if a subcarrier where the OFDM symbol including the starting position of the control information is located is occupied by a Demodulation Reference Signal (DMRS), the starting position of the control information may be determined to be at a starting point of a first subcarrier that does not include a DMRS after the subcarrier occupied by the DMRS.

In some examples, if the DMRS comprises a plurality of groups of DMRSs, the starting position of the control information may be determined to be at a starting position of a first OFDM symbol that does not include the DMRS after an OFDM symbol that is occupied by a first group of DMRSs in the plurality of groups of DMRSs.

In some examples, determining a symbol mapping of the signal based on a selected starting position or a set of candidate starting positions of the signal comprises: determining a starting position of the DMRS and/or control information carried in the signal based on a subcarrier spacing and/or a cyclic prefix used to transmit the signal.

The method comprises an operation S1430 of extracting the signal based on the symbol mapping.

Figure 15:
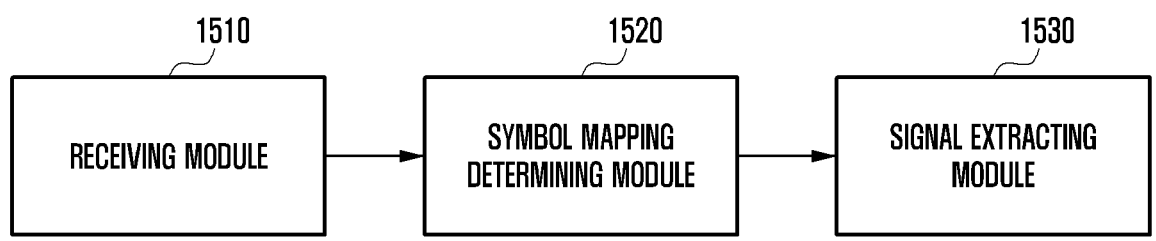
FIG. 15 illustrates an exemplary block diagram of an apparatus for receiving signals in accordance with an embodiment of the present invention.

FIG. 15 illustrates an example flow diagram of an apparatus for receiving signals in accordance with an embodiment of the present invention. As shown in FIG. 15, the apparatus includes a receiving module 1510, a symbol mapping determining module 1520, and a signal extracting module 1530. The receiving module 1510 is configured to receive a signal transmitted from the transmitting party. The symbol mapping determining module 1520 is configured to determine a symbol mapping of the signal based on a selected starting position or a set of candidate starting positions of the signal. Signal extraction module 1530 is configured to extract the signal based on the symbol mapping.

In some embodiments, the signal may be a Physical Uplink Shared Control Channel (PUSCH) or a Physical Downlink Shared Control Channel (PDSCH), which may be a Demodulation Reference Signal (DMRS). In this case, the symbol mapping determining module 1520 may be further configured to determine that a starting position of the DMRS is located at a starting boundary of an OFDM symbol if a candidate starting position that is the last in the set of candidate starting positions is located at the starting boundary of the OFDM symbol; and determine that a starting position of the DMRS is located at a starting boundary of a first OFDM symbol after the OFDM symbol if a candidate starting position that is the last in the set of candidate starting positions is not located at the starting boundary of the OFDM symbol.

In some examples, the DMRS may comprise a plurality of groups of DMRSs, and a starting position of the DMRS may be a starting position of a first group of DMRSs that is the earliest in the plurality of groups of DMRSs. In this case, the symbol mapping determining module 1520 may be further configured to determine positions of other groups of DMRSs in the plurality of groups of DMRSs with reference to the starting position of the first set of DMRSs based on an offset between positions of the plurality of groups of DMRSs.

In some embodiments, the signal may be a PUSCH or a PDSCH, which may be a Demodulation Reference Signal (DMRS), and the symbol mapping determining module 1520 may be further configured to: determine that the DMRS is located within a first complete OFDM symbol after the selected starting position of the PUSCH, and wherein the starting position of the DMRS is located after an OFDM symbol in which a Listen Before Talk (LTB) detection succeeds.

In some embodiments, the signal may be a PUSCH or a PDSCH, which may be uplink control information (UCI) or downlink control information (DCI), and the symbol mapping determining module 1520 may be further configured to: determine that a starting position of the control information is not earlier than a starting boundary of an OFDM symbol if a candidate starting position that is the last in the set of candidate starting positions is located at the starting boundary of the OFDM symbol; and determine that the starting position of the control information is not earlier than a starting boundary of a first OFDM symbol after the OFDM symbol if the candidate starting position that is the last in the set of candidate starting positions is not located at the starting boundary of the OFDM symbol.

In some examples, if the OFDM symbol including the starting position of the control information is occupied by a Demodulation Reference Signal (DMRS), the starting position of the control information may be determined to be at a starting boundary of a first OFDM symbol that does not include the DMRS after the OFDM symbol that is occupied by the DMRS.

In some examples, if a subcarrier where the OFDM symbol including the starting position of the control information is located is occupied by a Demodulation Reference Signal (DMRS) the starting position of the control information may be determined to be at a starting point of a first subcarrier that does not include a DMRS after the subcarrier occupied by the DMRS.

In some examples, if the DMRS comprises a plurality of groups of DMRSs, the starting position of the control information may be determined to be at a starting position of a first OFDM symbol that does not include the DMRS after an OFDM symbol that is occupied by a first group of DMRSs in the plurality of groups of DMRSs.

In some examples, symbol mapping determining module 1520 can be further configured to determine a starting position of the DMRS and/or control information carried in the signal based on a subcarrier spacing and/or a cyclic prefix used to transmit the signal.

Figure 16:
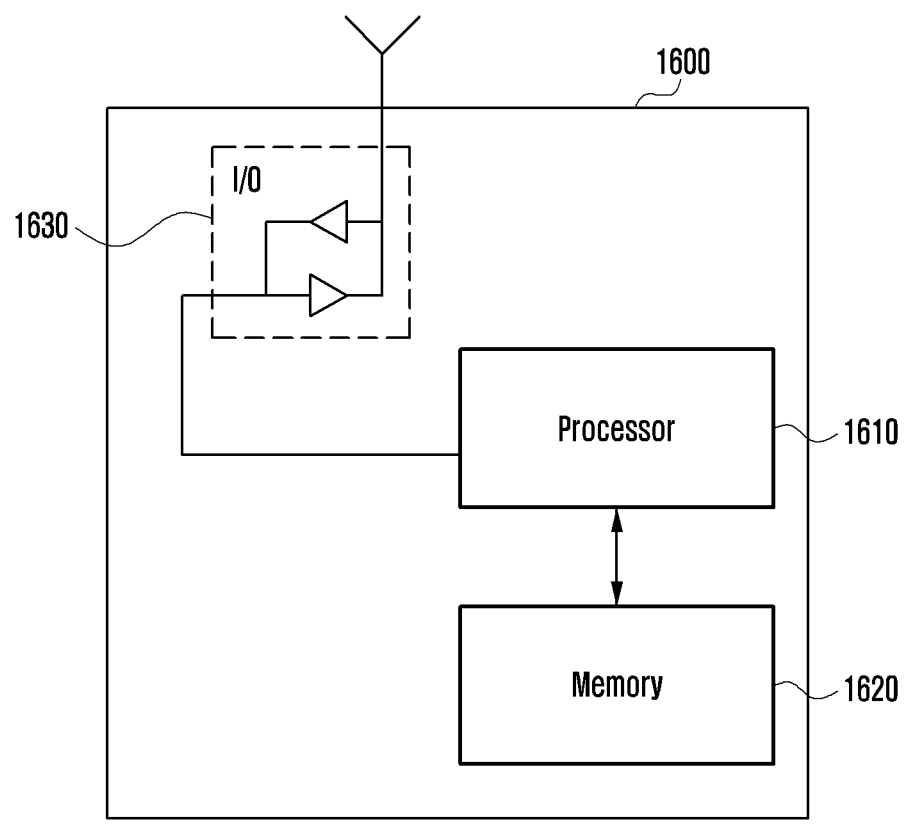
FIG. 16 is a schematic block diagram showing an apparatus in accordance with an embodiment of the present invention.

FIG. 16 schematically illustrates a block diagram of an apparatus 1600 in accordance with an embodiment of the present invention. The apparatus 1600 includes a processor 1610, such as a digital signal processor (DSP). The processor 1610 may be a single device or multiple devices for performing different actions in accordance with embodiments of the present invention. The apparatus 1600 may also include an input/output (I/O) device 1630 for receiving signals from other entities or for transmitting signals to other entities.

In addition, the apparatus 1600 includes a memory 1620 that may be in the form of a non-volatile or volatile memory, such as an electrically erasable programmable read only memory (EEPROM), flash memory, or the like. The memory 1620 stores computer readable instructions that, when executed by the processor 1610, cause the processor to perform a method in accordance with an embodiment of the present invention.

Those skilled in the art will appreciate that the methods shown above are merely exemplary. The method of the present invention is not limited to the steps and sequences shown above. The apparatus shown above may include more modules, for example, may also include modules that have been developed or developed in the future for base stations or UEs, and the like. The various identifiers shown above are merely exemplary and not limiting, and the invention is not limited to specific cells indicated by such identifiers. Many variations and modifications may be made by those skilled in the art in light of the teachings of the illustrated embodiments.

It should be understood that the above-described embodiments of the present invention may be implemented by software, hardware, or a combination thereof. For example, various components within the apparatus in the above embodiments may be implemented by various devices including, but not limited to, analog circuit devices, digital circuit devices, digital signal processing (DSP) circuits, programmable processors, dedicated Integrated Circuits (ASICs), Field Programmable Gate Arrays (FPGAs), Programmable Logic Devices (CPLDs), and others.

In the present application, "base station" refers to a mobile communication data and control switching center having a large transmission power and a relatively large coverage area, including functions such as resource allocation scheduling, data reception and transmission, and the like. "User equipment" refers to a user mobile terminal, for example, a terminal device including a mobile phone, a notebook, etc., which may perform wireless communication with a base station or a micro base station.

Moreover, embodiments of the invention disclosed herein may be implemented on a computer program product. More specifically, the computer program product is a computer readable medium encoded with computer program logic that, when executed on a computing device, provides related operations to implement the above technical solution of the present invention. The computer program logic, when executed on at least one processor of a computing system, causes the processor to perform the operations (methods) described in the embodiments of the present invention. Such an arrangement of the present invention is typically provided as software, code and/or other data structures that are arranged or encoded on a computer readable medium such as an optical medium (e.g., CD-ROM), floppy disk, or hard disk, or other medium such as firmware or microcode on one or more ROM or RAM or PROM chip, or downloadable software images, shared databases, etc. in one or more modules. Software or firmware or such a configuration may be installed on a computing device such that one or more processors in the computing device perform the technical solutions described in the embodiments of the present invention.

While the invention has been described in terms of the preferred embodiments of the present invention, it will be understood that various modification, alternations and changes may be made to the invention without departing from the spirit and scope o the invention. Therefore, the present invention should not be limited by the foregoing embodiments, and rather by the appended claims and their equivalents.

What is claimed is:

1. A method performed by a user equipment (UE) in a wireless communication system, the method comprising:
   identifying a number for uplink control information (UCI) associated with a configured grant (CG) based on a first $\beta$ offset;
   identifying a number for channel state information (CSI) based on a second $\beta$ offset; and
   transmitting, to a base station, a PUSCH including the UCI associated with the CG and the CSI, wherein the UCI associated with the CG is mapped to a first symbol that does not include a demodulation reference signal (DMRS) after a symbol carrying a DMRS, and wherein the UCI associated with the CG includes at least one of a new data indicator (NDI), a redundancy version (RV), or information on a hybrid automatic repeat request (HARQ) process.

2. The method according to claim 1, wherein the CSI is mapped to resources that do not carry the DMRS and the UCI associated with the CG.

3. A method performed by a base station in a wireless communication system, the method comprising:
receiving, from a user equipment (UE), a physical uplink shared channel (PUSCH) including uplink control information (UCI) associated with a configured grant (CG) and channel state information (CSI); and
decoding the PUSCH based on the UCI associated with the CG based on a first β offset and the CSI based on a second β offset,
wherein the UCI associated with the CG is mapped to a first symbol that does not include a demodulation reference signal (DMRS) after a symbol carrying a DMRS, and
wherein the UCI associated with the CG includes at least one of a new data indicator (NDI), a redundancy version (RV), or information on a hybrid automatic repeat request (HARQ) process.

4. The method according to claim 3, wherein the CSI is mapped to resources that do not carry the DMRS and the UCI associated with the CG.

5. A user equipment (UE), the UE comprising:
a transceiver; and
a controller configured to:
identify a number for uplink control information (UCI) associated with a configured grant (CG) based on a first β offset,
identify a number for channel state information (CSI) based on a second β offset, and
transmit, to a base station, a PUSCH including the UCI associated with the CG and the CSI,
wherein the UCI associated with the CG is mapped to a first symbol that does not include a demodulation reference signal (DMRS) after a symbol carrying a DMRS, and wherein the UCI associated with the CG includes at least one of a new data indicator (NDI), a redundancy version (RV), or information on a hybrid automatic repeat request (HARQ) process.

6. The UE according to claim 5, wherein the CSI is mapped to resources that do not carry the DMRS and the UCI associated with the CG.

7. A base station, the base station comprising:
a transceiver; and
a controller configured to:
receive, from a user equipment (UE), a physical uplink shared channel (PUSCH) including uplink control information (UCI) associated with a configured grant (CG) and channel state information (CSI), and
decode the PUSCH based on the UCI associated with the CG based on a first β offset and the CSI based on a second β offset,
wherein the UCI associated with the CG is mapped to a first symbol that does not include a demodulation reference signal (DMRS) after a symbol carrying a DMRS, and
wherein the UCI associated with the CG includes at least one of a new data indicator (NDI), a redundancy version (RV), or information on a hybrid automatic repeat request (HARQ) process.

8. The base station according to claim 7,
wherein the CSI is mapped to resources that do not carry the DMRS and the UCI associated with the CG.

9. The method according to claim 1, wherein the UCI associated with the CG includes a new data indicator (NDI), a redundancy version (RV), and information on a hybrid automatic repeat request (HARQ) process.

10. The method according to claim 3, wherein the UCI associated with the CG includes a new data indicator (NDI), a redundancy version (RV), and information on a hybrid automatic repeat request (HARQ) process.

11. The UE according to claim 5, wherein the UCI associated with the CG includes a new data indicator (NDI), a redundancy version (RV), and information on a hybrid automatic repeat request (HARQ) process.

12. The base station according to claim 7, wherein the UCI associated with the CG includes a new data indicator (NDI), a redundancy version (RV), and information on a hybrid automatic repeat request (HARQ) process.

* * * * *